(12) United States Patent
Zhao et al.

(10) Patent No.: US 12,437,263 B2
(45) Date of Patent: Oct. 7, 2025

(54) SYSTEMS AND METHODS OF MONITORING LOCATION LABELS OF PRODUCT STORAGE STRUCTURES OF A PRODUCT STORAGE FACILITY

(71) Applicant: Walmart Apollo, LLC, Bentonville, AR (US)

(72) Inventors: Chongrui Zhao, San Mateo, CA (US); Shanthi Narayanan, Parrish, FL (US); Tracy E. Benson, Campbell, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 197 days.

(21) Appl. No.: 18/203,499

(22) Filed: May 30, 2023

(65) Prior Publication Data
US 2024/0403819 A1    Dec. 5, 2024

(51) Int. Cl.
*G06Q 10/00*    (2023.01)
*G06Q 10/0631*    (2023.01)
(Continued)

(52) U.S. Cl.
CPC ..... *G06Q 10/087* (2013.01); *G06Q 10/06316* (2013.01); *G06V 20/50* (2022.01);
(Continued)

(58) Field of Classification Search
None
See application file for complete search history.

(56) References Cited

U.S. PATENT DOCUMENTS 5,074,594 A    12/1991    Laganowski
6,570,492 B1    5/2003    Peratoner
(Continued)

FOREIGN PATENT DOCUMENTS

CN    106347550 B    8/2019
CN    110348439 B    10/2019
(Continued)

OTHER PUBLICATIONS

U.S. Appl. No. 17/963,751, filed Oct. 11, 2022, Yilun Chen.
(Continued)

*Primary Examiner* — Matheus Ribeiro Stivaletti
(74) *Attorney, Agent, or Firm* — Foley IP Law, PLLC

(57) ABSTRACT

Systems and methods of monitoring location labels on product storage structures of a product storage facility include an image capture device that captures images of the product storage structures and a computing device programmed to analyze the images of the product storage structures captured by the image capture device to detect location labels located on the product storage structures. Based on detection that one or more location labels located on the product storage structures are associated with an error condition, the computing device generates a location label alert indicating at least one location label that requires a location label check by a worker at the product storage facility. A mobile application executable on a device of the worker at the product storage facility displays a user interface that lists location labels alerts and permits the worker to print replacement labels for product structures associated with the alerts.

20 Claims, 15 Drawing Sheets

(51) Int. Cl.
*G06Q 10/087* (2023.01)
*G06V 20/00* (2022.01)
*G06V 20/50* (2022.01)
*G06V 20/62* (2022.01)
*G06V 30/00* (2022.01)
*G06V 30/10* (2022.01)
G06K 7/14 (2006.01)
G06K 15/02 (2006.01)

(52) U.S. Cl.
CPC .............. *G06V 20/63* (2022.01); *G06V 30/10* (2022.01); *G06K 7/1413* (2013.01); *G06K 15/024* (2013.01)

(56) References Cited

U.S. PATENT DOCUMENTS

| | | |
|---|---|---|
| 8,700,494 B2 | 4/2014 | Carlson |
| 8,923,650 B2 | 12/2014 | Wexler |
| 8,965,104 B1 | 2/2015 | Hickman |
| 9,275,308 B2 | 3/2016 | Szegedy |
| 9,477,955 B2 | 10/2016 | Goncalves |
| 9,526,127 B1 | 12/2016 | Taubman |
| 9,576,310 B2 | 2/2017 | Cancro |
| 9,659,204 B2 | 5/2017 | Wu |
| 9,811,754 B2 | 11/2017 | Schwartz |
| 10,002,344 B2 | 6/2018 | Wu |
| 10,019,803 B2 | 7/2018 | Venable |
| 10,032,072 B1 | 7/2018 | Tran |
| 10,129,524 B2 | 11/2018 | Ng |
| 10,210,432 B2 | 2/2019 | Pisoni |
| 10,373,116 B2 | 8/2019 | Medina |
| 10,572,757 B2 | 2/2020 | Graham |
| 10,592,854 B2 | 3/2020 | Schwartz |
| 10,796,352 B2 | 10/2020 | Chechuy |
| 10,839,452 B1 | 11/2020 | Guo |
| 10,922,574 B1 | 2/2021 | Tariq |
| 10,943,278 B2 | 3/2021 | Benkreira |
| 10,956,711 B2 | 3/2021 | Adato |
| 10,990,950 B2 | 4/2021 | Garner |
| 10,991,036 B1 | 4/2021 | Bergstrom |
| 11,036,949 B2 | 6/2021 | Powell |
| 11,055,905 B2 | 7/2021 | Tagra |
| 11,087,272 B2 | 8/2021 | Skaff |
| 11,151,426 B2 | 10/2021 | Dutta |
| 11,163,805 B2 | 11/2021 | Arocho |
| 11,276,034 B2 | 3/2022 | Shah |
| 11,282,287 B2 | 3/2022 | Gausebeck |
| 11,295,163 B1 | 4/2022 | Schoner |
| 11,308,775 B1 | 4/2022 | Sinha |
| 11,409,977 B1 | 8/2022 | Glaser |
| 2005/0238465 A1 | 10/2005 | Razumov |
| 2009/0063307 A1 | 3/2009 | Groenovelt et al. |
| 2010/0188580 A1 | 7/2010 | Paschalaks |
| 2011/0040427 A1 | 2/2011 | Ben-Tzvi |
| 2012/0303412 A1 | 11/2012 | Etzioni |
| 2013/0232039 A1 | 9/2013 | Jackson et al. |
| 2014/0002239 A1 | 1/2014 | Rayner |
| 2014/0247116 A1 | 9/2014 | Davidson |
| 2014/0307938 A1 | 10/2014 | Doi |
| 2015/0363660 A1 | 12/2015 | Vidal |
| 2016/0203525 A1 | 7/2016 | Hara |
| 2017/0106738 A1 | 4/2017 | Gillett |
| 2017/0286773 A1 | 10/2017 | Skaff |
| 2017/0357937 A1 | 12/2017 | Edens |
| 2018/0005176 A1 | 1/2018 | Williams |
| 2018/0018788 A1 | 1/2018 | Olmstead |
| 2018/0089613 A1 | 3/2018 | Chen et al. |
| 2018/0108134 A1 | 4/2018 | Venable |
| 2018/0197223 A1 | 7/2018 | Grossman |
| 2018/0260772 A1 | 9/2018 | Chaubard |
| 2018/0276596 A1 | 9/2018 | Murthy et al. |
| 2019/0025849 A1 | 1/2019 | Dean |
| 2019/0043003 A1 | 2/2019 | Fisher |
| 2019/0050932 A1 | 2/2019 | Dey |
| 2019/0080277 A1* | 3/2019 | Trivelpiece ............ G06N 20/00 |
| 2019/0087772 A1 | 3/2019 | Medina |
| 2019/0163698 A1 | 5/2019 | Kwon |
| 2019/0197561 A1 | 6/2019 | Adato |
| 2019/0220482 A1 | 7/2019 | Crosby |
| 2019/0236531 A1 | 8/2019 | Adato |
| 2020/0118063 A1 | 4/2020 | Fu |
| 2020/0118064 A1* | 4/2020 | Perrella ............... G06F 16/2246 |
| 2020/0246977 A1 | 8/2020 | Swietojanski |
| 2020/0265494 A1 | 8/2020 | Glaser |
| 2020/0324976 A1 | 10/2020 | Diehr |
| 2020/0356813 A1 | 11/2020 | Sharma |
| 2020/0380226 A1 | 12/2020 | Rodriguez |
| 2020/0387858 A1 | 12/2020 | Hasan |
| 2020/0402429 A1 | 12/2020 | Cho |
| 2021/0049541 A1 | 2/2021 | Gong |
| 2021/0049542 A1 | 2/2021 | Dalal |
| 2021/0142105 A1 | 5/2021 | Siskind |
| 2021/0150231 A1 | 5/2021 | Kehl |
| 2021/0192780 A1 | 6/2021 | Kulkarni |
| 2021/0216954 A1 | 7/2021 | Chaubard |
| 2021/0272269 A1 | 9/2021 | Suzuki |
| 2021/0319684 A1 | 10/2021 | Ma |
| 2021/0342914 A1 | 11/2021 | Dalal |
| 2021/0374662 A1 | 12/2021 | Bogolea |
| 2021/0400195 A1* | 12/2021 | Adato ................ G06Q 30/0201 |
| 2021/0406812 A1 | 12/2021 | Deshmukh |
| 2022/0043547 A1 | 2/2022 | Jahjah |
| 2022/0051179 A1 | 2/2022 | Savvides |
| 2022/0058425 A1 | 2/2022 | Savvides |
| 2022/0067085 A1 | 3/2022 | Nihas |
| 2022/0114403 A1 | 4/2022 | Shaw |
| 2022/0114821 A1 | 4/2022 | Arroyo |
| 2022/0138914 A1 | 5/2022 | Wang |
| 2022/0165074 A1 | 5/2022 | Srivastava |
| 2022/0222924 A1 | 7/2022 | Pan |
| 2022/0262008 A1 | 8/2022 | Kidd |
| 2022/0303445 A1* | 9/2022 | Skaff ..................... H04N 23/57 |

FOREIGN PATENT DOCUMENTS

| | | | |
|---|---|---|---|
| CN | 110443298 B | 2/2022 | |
| CN | 114898358 A | 8/2022 | |
| CN | 115205584 A | 10/2022 | |
| EP | 2821185 A1 * | 1/2015 | ............... B25H 3/02 |
| EP | 3217324 A1 | 9/2017 | |
| EP | 3437031 | 2/2019 | |
| EP | 3479298 | 5/2019 | |
| WO | 2006113281 A2 | 10/2006 | |
| WO | 2017201490 A1 | 11/2017 | |
| WO | 2018093796 | 5/2018 | |
| WO | 2020051213 A1 | 3/2020 | |
| WO | 2021186176 A1 | 9/2021 | |
| WO | 2021247420 A2 | 12/2021 | |

OTHER PUBLICATIONS

U.S. Appl. No. 17/963,787, filed Oct. 11, 2022, Lingfeng Zhang.
U.S. Appl. No. 17/963,802, filed Oct. 11, 2022, Lingfeng Zhang.
U.S. Appl. No. 17/963,903, filed Oct. 11, 2022, Raghava Balusu.
U.S. Appl. No. 17/966,580, filed Oct. 14, 2022, Paarvendhan Puviyarasu.
U.S. Appl. No. 17/971,350, filed Oct. 21, 2022, Jing Wang.
U.S. Appl. No. 17/983,773, filed Nov. 9, 2022, Lingfeng Zhang.
U.S. Appl. No. 18/102,999, filed Jan. 30, 2023, Han Zhang.
U.S. Appl. No. 18/103,338, filed Jan. 30, 2023, Wei Wang.
U.S. Appl. No. 18/106,269, filed Feb. 6, 2023, Zhaoliang Duan.
U.S. Appl. No. 18/158,925, filed Jan. 24, 2023, Raghava Balusu.
U.S. Appl. No. 18/158,950, filed Jan. 24, 2023, Ishan Arora.
U.S. Appl. No. 18/158,969, filed Jan. 24, 2023, Zhaoliang Duan.
U.S. Appl. No. 18/158,983, filed Jan. 24, 2023, Ashlin Ghosh.
U.S. Appl. No. 18/161,788, filed Jan. 30, 2023, Raghava Balusu.
U.S. Appl. No. 18/165,152, filed Feb. 6, 2023, Han Zhang.
U.S. Appl. No. 18/168,174, filed Feb. 13, 2023, Abhinav Pachauri.
U.S. Appl. No. 18/168,198, filed Feb. 13, 2023, Ashlin Ghosh.
Chaudhuri, Abon et al.; "A Smart System for Selection of Optimal Product Images in E-Commerce"; 2018 IEEE Conference on Big

(56) References Cited

OTHER PUBLICATIONS

Data (Big Data); Dec. 10-13, 2018; IEEE; <https://ieeexplore.ieee.org/document/8622259>; pp. 1728-1736.
Chenze, Brandon et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; 6 pages.
Kaur, Ramanpreet et al.; "A Brief Review on Image Stitching and Panorama Creation Methods"; International Journal of Control Theory and Applications; 2017; vol. 10, No. 28; International Science Press; Gurgaon, India; < https://www.researchgate.net/publication/348232877 >; 11 pages.
Naver Engineering Team; "Auto-classification of Naver Shopping Product Categories using TensorFlow"; <https://blog.tensorflow.org/2019/05/auto-classification-of-naver-shopping.html>; May 20, 2019; pp. 1-15.
Paolanti, Marine et al.; "Mobile robot for retail surveying and inventory using visual and textual analysis of monocular pictures based on deep learning"; European Conference on Mobile Robots; Sep. 2017, 6 pages.
Refills; "Final 3D object perception and localization"; European Commision, Dec. 31, 2016, 16 pages.
Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.
Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.
Singh, Ankit; "Automated Retail Shelf Monitoring Using AI"; <https://blog.paralleldots.com/shelf-monitoring/automated-retail-shelf-monitoring-using-ai/>; Sep. 20, 2019; pp. 1-10.
Singh, Ankit; "Image Recognition and Object Detection in Retail"; <https://blog.paralleldots.com/featured/image-recognition-and-object-detection-in-retail/>; Sep. 26, 2019; pp. 1-11.
Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; 6 pages.
Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.
Technology Robotix Society; "Colour Detection"; <https://medium.com/image-processing-in-robotics/colour-detection-e15bc03b3f61>; Jul. 2, 2019; pp. 1-6.
Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.
Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.
Verma, Nishchal, et al.; "Object identification for inventory management using convolutional neural network"; IEEE Applied Imagery Pattern Recognition Workshop (AIPR); Oct. 2016, 6 pages.
Zhang, Jicun, et al.; "An Improved Louvain Algorithm for Community Detection"; Advanced Pattern and Structure Discovery from Complex Multimedia Data Environments 2021; Nov. 23, 2021; Mathematical Problems in Engineering; Hindawi; <https://www.hindawi.com/journals/mpe/2021/1485592/>; pp. 1-27.
Rodriquez, K., "International Search Report & Written Opinion", International Patent Application No. PCT/US24/27420, mailed Jul. 29, 2024, 9 pages.

\* cited by examiner

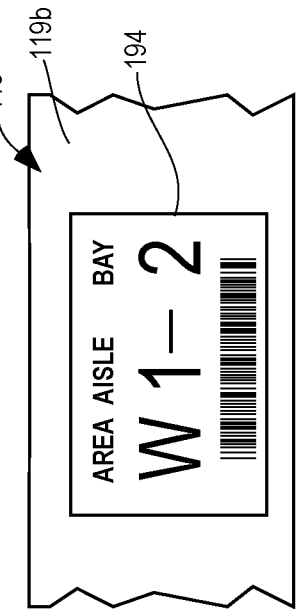
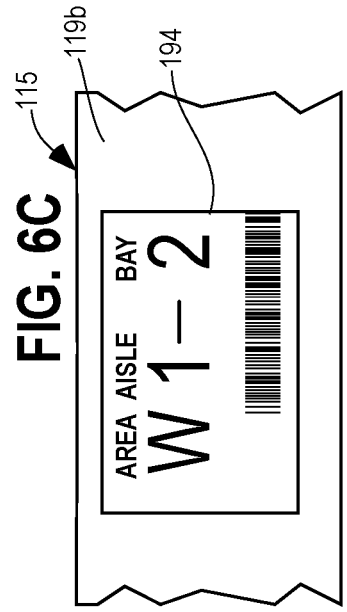
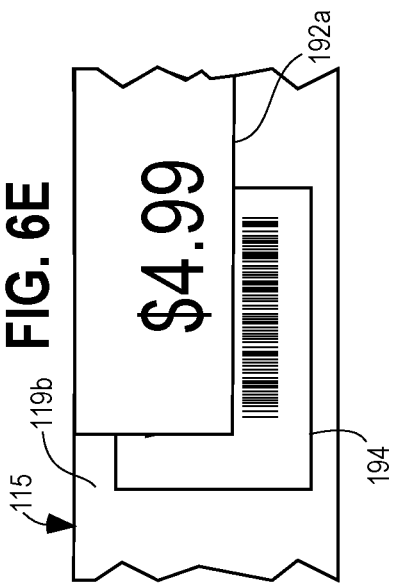
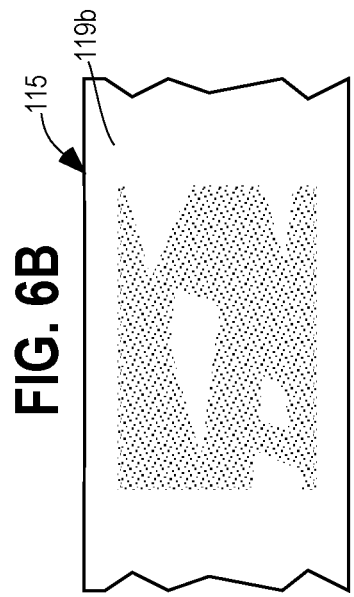
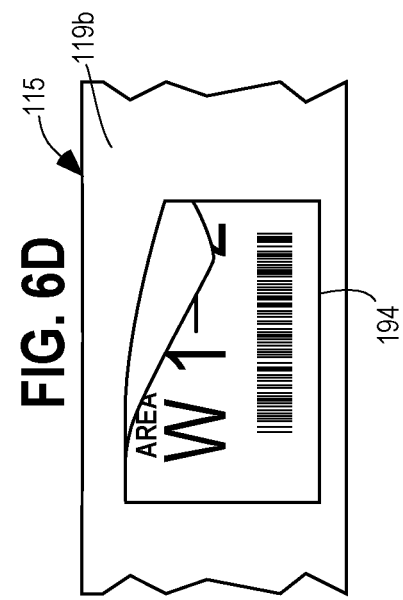

SYSTEMS AND METHODS OF
MONITORING LOCATION LABELS OF
PRODUCT STORAGE STRUCTURES OF A
PRODUCT STORAGE FACILITY

TECHNICAL FIELD

This disclosure relates generally to product storage structures at product storage facilities, and in particular, to location labels on the product storage structures of a product storage facility.

BACKGROUND

A typical product storage facility (e.g., a retail store, a product distribution center, a warehouse, etc.) may have hundreds of shelves and thousands of products stored on the shelves and/or on pallets. Individual products offered for sale to consumers are typically stocked on shelves, pallets, and/or each other in a product storage space having a location label indicating the location of the product storage structure assigned thereto. It is common for workers of such product storage facilities to manually (e.g., visually) inspect product storage structures to verify whether the on-shelf products are properly labeled with appropriate location labels.

Given the very large number of product storage areas such as shelves, pallets, and other product displays at product storage facilities of large retailers, manual inspection of the location labels on the product storage structures of the product storage facility by the workers is very time consuming and significantly increases the operations cost for a retailer, since these workers could be performing other tasks if they were not involved in manually inspecting the product storage areas to detect location label issues.

BRIEF DESCRIPTION OF THE DRAWINGS

Disclosed herein are embodiments of monitoring location labels on product storage structures of a product storage facility. This description includes drawings, wherein:

FIG. 6A is a diagram of an enlarged portion of the horizontal support member having a location label thereon that is not damaged, deformed, or incomplete;

FIG. 6B is a diagram of an enlarged portion of the horizontal support member having a missing location label and the space where the location label is supposed to be is empty;

FIG. 6C is a diagram of an enlarged portion of the horizontal support member having a location label thereon that is incomplete because the location label is missing a portion of the barcode;

FIG. 6D is a diagram of an enlarged portion of the horizontal support member having a location label thereon that is deformed because a corner of the location label is folded in and obstructs a portion of the area/aisle/bay location identifier on the location label;

FIG. 6E is a diagram of an enlarged portion of the horizontal support member having a location label thereon that is partially obstructed by a price tag label such that the area/aisle/bay location identifier on the location label is not visible;

Figure 1:
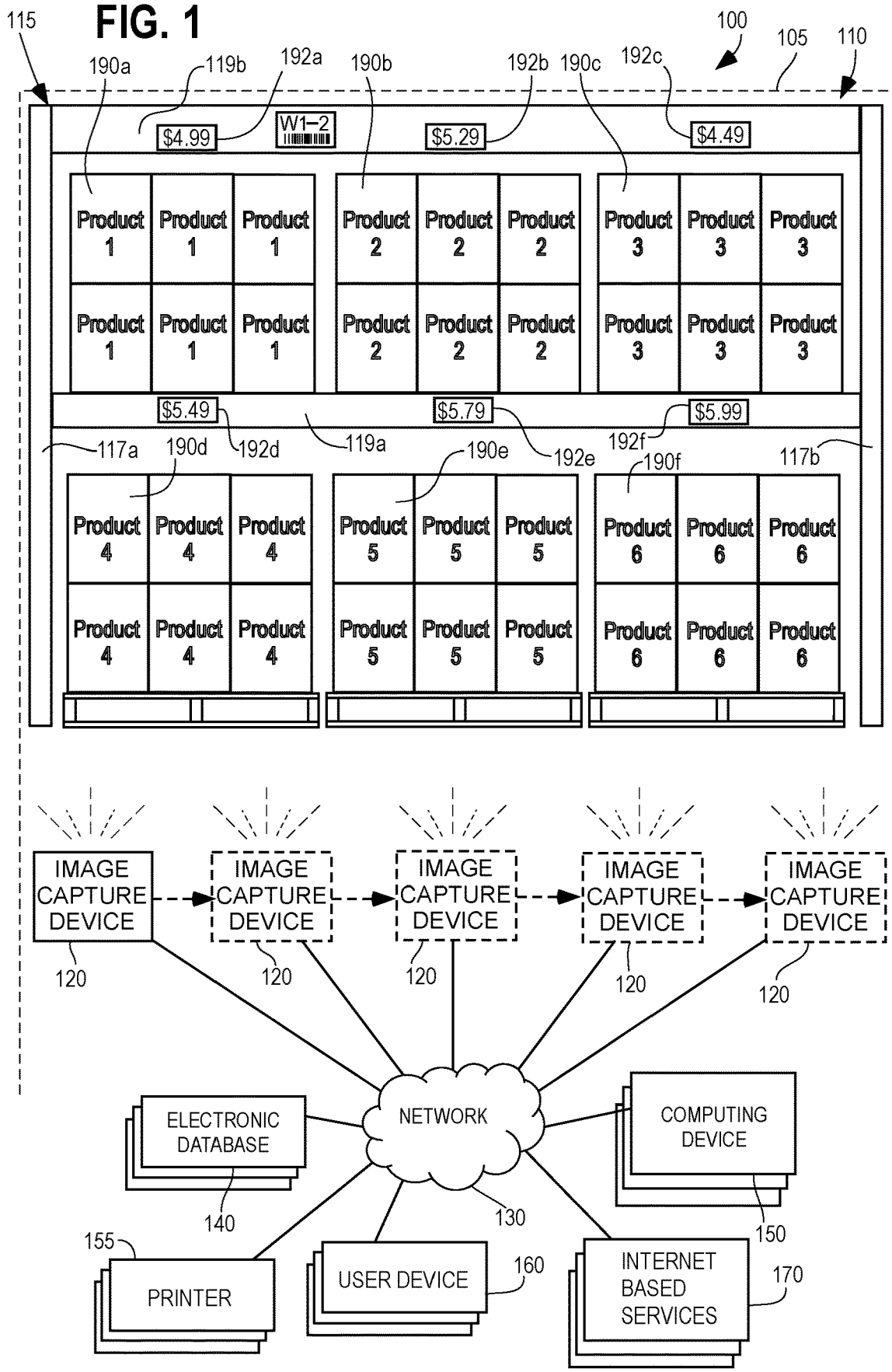
FIG. 1 is a diagram of an exemplary system of monitoring location labels on product storage structures of a product storage facility in accordance with some embodiments, depicting a front view of a product storage structure having a location label associated therewith that is being monitored by an image capture device that is configured to move about the product storage facility.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, systems and methods of monitoring location labels on product storage structures of a product storage facility include an image capture device that captures images of the product storage structures and a computing device programmed to analyze the images of the product storage structures captured by the image capture device to detect at least one location label located on the product storage structures. Based on detection that one or more location labels located on the product storage structures are associated with an error condition, the computing device generates a location label alert indicating at least one location label that requires a location label check by a worker at the product storage facility. A mobile application executable on a device of the worker at the product storage facility displays a user interface that lists location labels alerts and permits the worker to print replacement labels for product storage structures associated with the alerts.

In some embodiments, a system for monitoring location labels on product storage structures of a product storage facility includes: an image capture device having a field of view that includes a product storage structure at the product storage facility configured to have products arranged thereon, wherein the image capture device is configured to capture at least one image of the product storage structure, as well as a computing device including a control circuit, the computing device communicatively coupled to the image capture device. The control circuit of the computing device is configured to: analyze the at least one image of the product storage structure captured by the image capture device to detect at least one location label located on the product storage structure; and based on detection that the at least one location label located on the product storage structure is at least one of missing, incomplete, damaged, deformed, and at least partially obstructed, generate a location label alert indicating that the at least one location label requires a location label check by a worker at the product storage facility. The system further includes a mobile application executable on a user device of the worker at the product storage facility, the mobile application, when executed, is configured to cause a user interface to be displayed to the worker on a display of the user device, wherein the user interface lists at least one location label alert generated by the control circuit of the computing device. The user interface permits the worker to: view a location of the product storage structure associated with the location label alert; generate a replacement label for the product storage structure associated with the location label alert and output signaling to cause the replacement label to be printed; and scan the replacement label to verify that the worker affixed the replacement label to the product storage structure associated with the location label alert.

In some embodiments, a method of monitoring location labels on product storage structures of a product storage facility includes: capturing at least one image of a product storage structure at the product storage facility configured to have products arranged thereon by an image capture device having a field of view that includes the product storage structure at the product storage facility; and by a computing device including a control circuit and communicatively coupled to the image capture device: analyzing the at least one image of the product storage structure captured by the image capture device to detect at least one location label located on the product storage structure; and based on detection that the at least one location label located on the product storage structure is at least one of missing, incomplete, damaged, deformed, and at least partially obstructed, generating a location label alert indicating that the at least one location label requires a location label check by a worker at the product storage facility; and by a mobile application executable on a user device of the worker at the product storage facility, causing a user interface to be displayed to the worker on a display of the user device, wherein the user interface lists at least one location label alert generated by the control circuit of the computing device, wherein the user interface permits the worker to: view a location of the product storage structure associated with the location label alert; generate a replacement label for the product storage structure associated with the location label alert and output signaling to cause the replacement label to be printed; and scan the replacement label to verify that the worker affixed the replacement label to the product storage structure associated with the location label alert.

FIG. 1 shows an embodiment of a system 100 of monitoring location labels 194 on product storage structures 115 of a product storage facility at a product storage facility 105 (e.g., which may be a retail store, a product distribution center, a warehouse, etc.). The system 100 is illustrated in FIG. 1 for simplicity with only one movable image capture device 120 that moves about one product storage area 110 containing one product storage structure 115, but it will be appreciated that the system 100 may include multiple movable image capture devices 120 located throughout the product storage facility 105 that monitor hundreds of product storage areas 110 of and thousands of product storage structures 115.

It is understood the direction and type of movement of the image capture device 120 about the product storage area 110 of the product storage facility 105 may depend on the physical arrangement of the product storage area 110 and/or the size and shape of the product storage structure 115. For example, the image capture device 120 may move linearly down an aisle alongside a product storage structure 115 (e.g., a shelving unit) located in a product storage area 110 of a product storage facility 105, or may move in a circular fashion around a table having curved/multiple sides. Notably, while the location label 194 is referred to herein as an "on-shelf location label," it will be appreciated that the location label 194 does not necessarily have to be affixed to horizontal support members 119a or 119b (which may be shelves, etc.) of the product storage structure 115 as shown in FIG. 1 and may be located in a different location (e.g., adjacent the product storage structure 115, or on the vertical support members 117a and 117b (which may be support posts interconnecting the shelves).

Notably, the term "product storage structure" as used herein generally refers to a structure on which the products 190 are stored, and may include a pallet, a shelf cabinet, a single shelf, table, rack, refrigerator, freezer, displays, bins, gondola, case, countertop, or another product display. Likewise, it will be appreciated that the number (i.e., 24 shown in FIG. 1) of individual products 190a-190f representing individual units of six different products (generically labeled as "Product 1," "Product 2," "Product 3," "Product 4," "Product 5," and "Product 6" in FIG. 1, which may be any retail products that are stocked on shelves of a product storage facility 105) is chosen for simplicity and by way of example only, and that the product storage structure 115 may store any number of units of the products 190a-190f thereon. Notably, the prices (e.g., $4.99, $5.29, etc.) on the price tag labels 192a-192f are illustrated by way of example only.

Further, the size and shape of the products 190a-190f in FIG. 1 have been shown by way of example only, and it will be appreciated that the products 190a-190f may be of various sizes and shapes. Notably, the term "products" may refer to an individual one of the products 190a-190f (some of which may be single-piece/single-component products and some of which may be multi-piece/multi-component products), as well as to packages or containers of the one of the products 190a-190f, which may be plastic-or paper-based packaging that includes multiple units of a given product 190a-190f (e.g., a plastic wrap that includes 36 rolls of identical paper towels, a paper box that includes 10 packs of identical diapers, etc.). Alternatively, the packaging of the individual products 190a-190f may be a plastic-or paper-based container that encloses one individual product 190a-190f (e.g., a box of cereal, a bottle of shampoo, etc.).

The image capture device 120 (also referred to as an image capture unit) of the exemplary system 100 depicted in FIG. 1 is configured for movement about the product storage facility 105 (e.g., on the floor via a motorized or non-motorized wheel-based and/or track-based locomotion system, or via slidable tracks above the floor, etc.) such that, when moving (e.g., about an aisle or other area of a product storage facility 105), the image capture device 120 has a field of view that includes at least a portion the product storage structure 115 within the product storage area 110 of the product storage facility 105, permitting the image capture device 120 to capture multiple images of the product storage area 110 and the product storage structure 115 from various viewing angles. In some embodiments, the image capture device 120 is configured as robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which is independent of capturing images of product storage areas 110 of the product storage facility 105.

In some embodiments, as will be described in more detail below, the images of the product storage area 110 captured by the image capture device 120 while moving about the product storage area are transmitted by the image capture device 120 over a network 130 to an electronic database 140 and/or to a computing device 150. In some aspects, the computing device 150 (or a separate image processing internet based/cloud-based service 170) is configured to process such images as will be described in more detail below.

The exemplary system 100 includes an electronic database 140. Generally, the exemplary electronic database 140 of FIG. 1 may be configured as a single database, or a collection of multiple communicatively connected databases (e.g., digital image database, meta data database, inventory database, price tag label database, location label database, pricing database, customer database, vendor database, manufacturer database, etc.) and is configured to store various raw and processed images (e.g., 180, 182) of the product storage area 110 captured by the image capture device 120 while the image capture device 120 is moving about the product storage facility 105. In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

The system 100 of FIG. 1 further includes a computing device 150 (which may be one or more computing devices as pointed out below) configured to communicate with the electronic database 140 (which may be one or more databases as pointed out below), the image capture device 120, user device 160 (which may be one or more user devices as pointed out below), and/or internet-based service 170 (which may be one or more internet-based services as pointed out below) over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, the one or more computing devices 150, one or more electronic databases 140, one or more user devices 160, and/or portions of the network 130 are located at, or in the product storage facility 105.

The computing device 150 may be a stationary or portable electronic device, for example, a desktop computer, a laptop computer, a single server or a series of communicatively connected servers, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140. In some embodiments, the computing device 150 and the image capture device 120 may be implemented as two separate physical devices, but it will be appreciated that, in some embodiments, the computing device 150 and the image capture device may be implemented as a single physical device (e.g., the image capture device 120 may include an onboard computing device 150).

Figure 2:
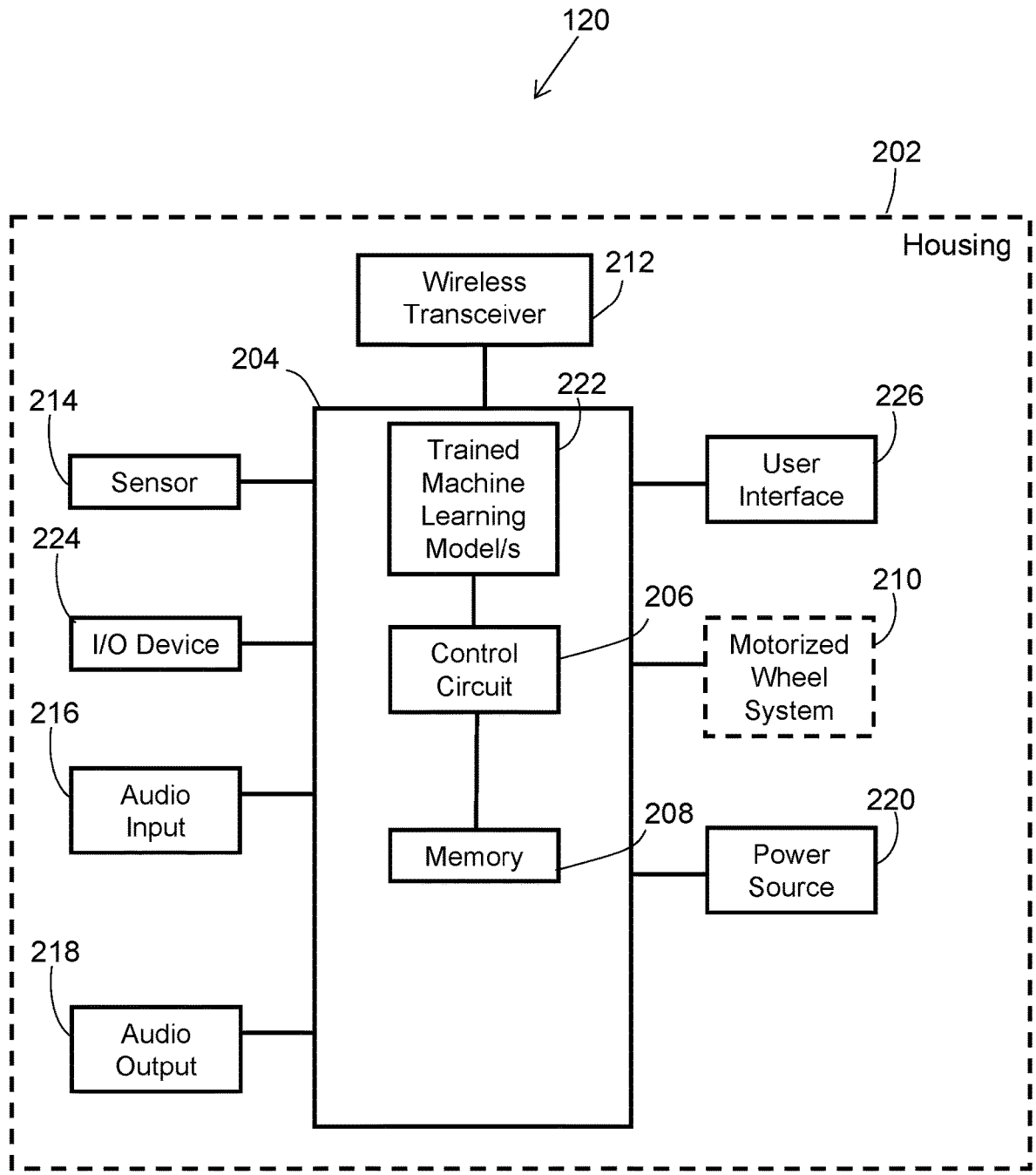
FIG. 2 comprises a block diagram of an exemplary image capture device in accordance with some embodiments.

FIG. 2 presents a more detailed example of an exemplary motorized robotic unit or image capture device 120. As mentioned above, the image capture device 120 does not necessarily need an autonomous motorized wheel-based and/or track-based system to move about the product storage facility 105, and may instead be moved (e.g., driven, pushed, carried, worn, etc.) by a human operator, or may be movably coupled to a track system (which may be above the floor level or at the floor level) that permits the image capture device 120 to move about the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 and that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates about a horizontal axis) under power to thereby cause the image capture device 120 to move through interaction with, e.g., the floor of the product storage facility 105. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated that the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 is configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility 105. So configured, the control circuit 206 of the image capture device 120 can provide information to the computing device 150 (via the network 130) and can receive information and/or movement instructions from computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a laser imaging, detection, and ranging (LIDAR) sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility 105 or other motorized image capture devices 120 moving about the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (e.g., where is product storage structure number so-and-so?, how many products are stocked on product storage structure so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control circuit 204, allow the exporting of data from the control unit 206, allow the diagnosing of the motorized image capture device 120, and so on.

In some embodiments, the motorized image capture device 120 includes a user interface 226 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 226 may work together with or separate from any user interface implemented at an optional user interface unit or user device 160 (such as a smart phone or tablet device) usable by a worker at the product storage facility 105. In some embodiments, the user interface 226 is separate from the image capture device 120, e.g., in a separate housing or device wired or wirelessly coupled to the image capture device 120. In some embodiments, the user interface 226 may be implemented in a mobile user device 160 carried by a person (e.g., worker at product storage facility 105) and configured for communication over the network 130 with the image capture device 120.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules/models 222 to perform at some of the functions. For example, the control circuit 310 may be trained to process one or more images 180 of product storage areas 110 at the product storage facility 105 to detect and/or recognize one or more products 190, location labels 194, etc. using one or more machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning module/model 222 includes a computer program code stored in a memory 208 and/or executed by the control circuit 206 to process one or more images 180, as described in more detail below.

It is noted that not all components shown in FIG. 2 are included in all embodiments of the motorized image capture device 120. That is, some components may be optional depending on the implementation of the motorized image capture device 120. It will be appreciated that while the image capture device 120 of FIG. 2 is a motorized robotic unit capable of moving about the product storage facility 105 while being controlled remotely (e.g., by the computing device 150) and without being controlled by an onboard human operator, in some embodiments, the image capture device 120 may be configured to permit an onboard human operator (i.e., driver) to direct the movement of the image capture device 120 about the product storage facility 105.

Figure 3:
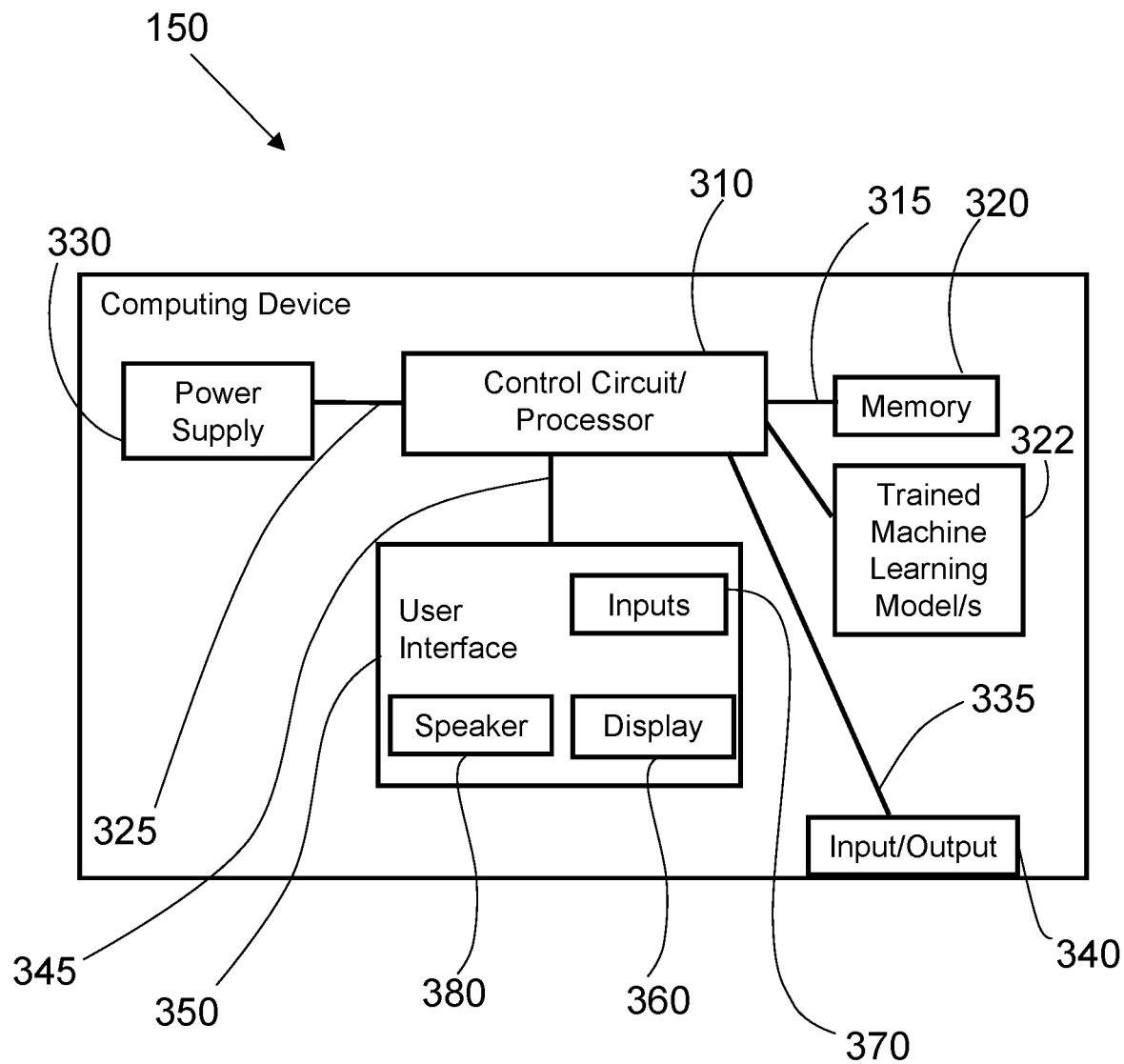
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

Figure 4:
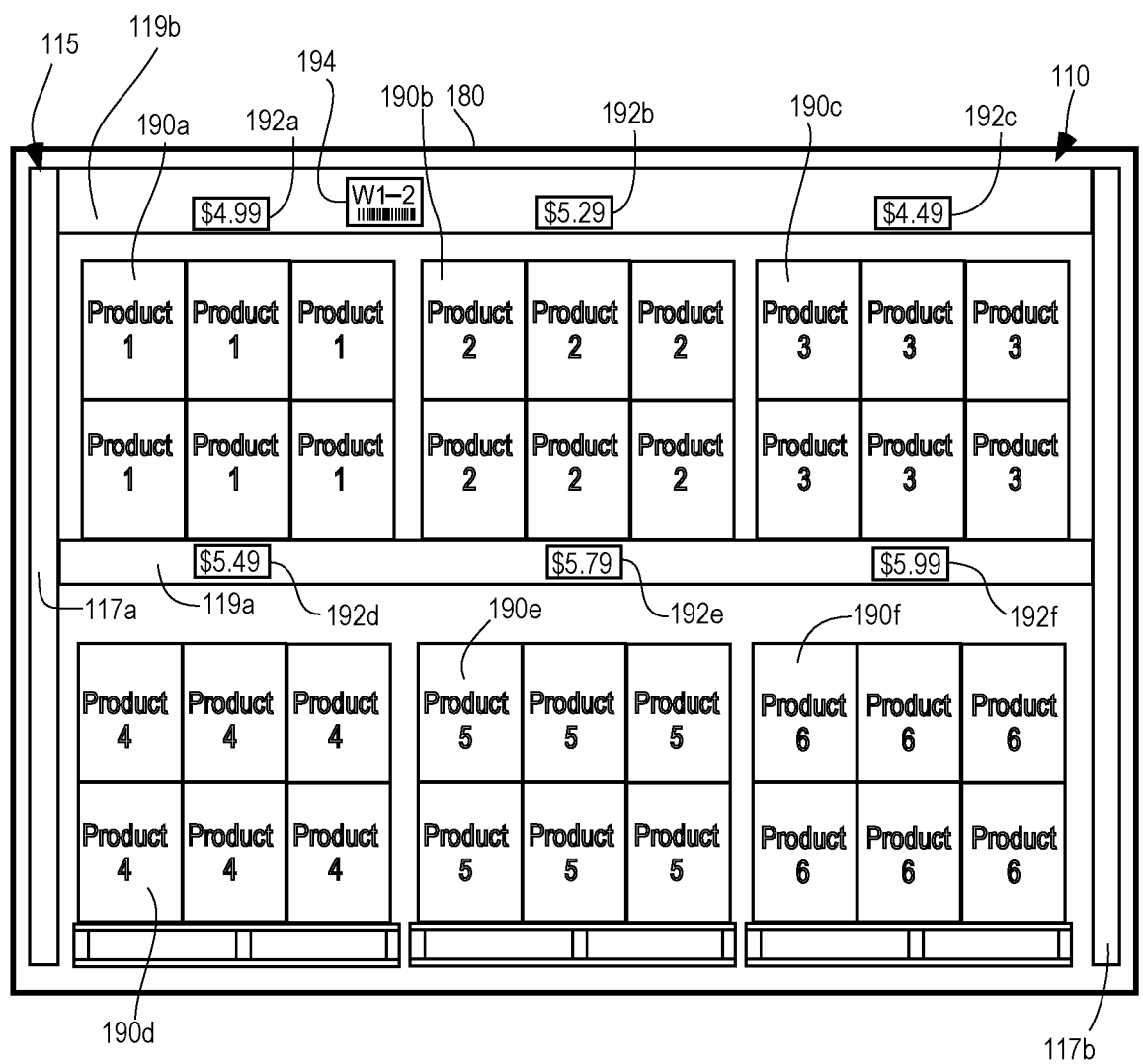
FIG. 4 is a diagram of an exemplary image of the product storage structure of FIG. 1, taken by the image capture device and depicting the product storage structure of FIG. 1 and all of the products, price tag labels, and location label thereon.
Figure 5:
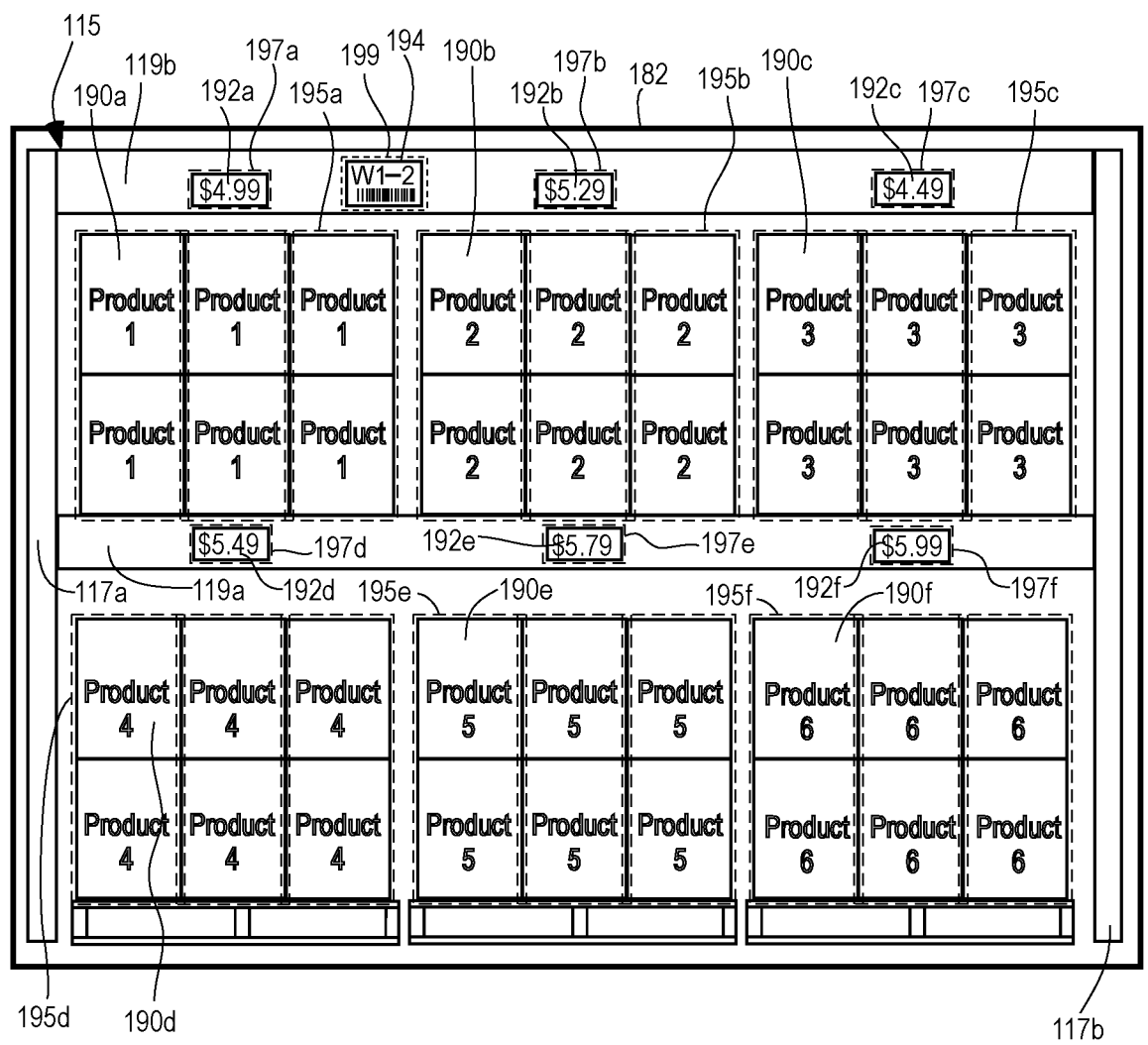
FIG. 5 is a diagram of the exemplary image of FIG. 4, after the image is processed to detect the individual products, price tag labels, and location label located on the product storage structure and to generate virtual boundary lines around each of the products, price tag labels, and location label detected in the image.

The control circuit 310 of the computing device 150 is also electrically coupled via a connection 335 to an input/output 340 that can receive signals from, for example, from the image capture device 120, the electronic database 140, internet-based service 170 (e.g., one or more of an image processing service, computer vision service, neural network service, etc.), and/or from another electronic device (e.g., an electronic device or user device 160 of a worker tasked with physically inspecting the product storage area 110 and/or the product storage structure 115 and observing the location label 194 associated therewith). The input/output 340 of the computing device 150 can also send signals to other devices, for example, a signal to the electronic database 140 including a raw image 180 of a product storage structure 115 as shown in FIG. 4, or a processed image 182 of the product storage structure 115 as shown in FIG. 5. Also, a signal may be sent by the computing device 150 via the input/output 340 to the image capture device 120 to, e.g., provide a route of movement for the image capture device 120 through the product storage facility 105.

The processor-based control circuit 310 of the computing device 150 shown in FIG. 3 is electrically coupled via a connection 345 to a user interface 350, which may include a visual display or display screen 360 (e.g., LED screen) and/or button input 370 that provide the user interface 350 with the ability to permit an operator of the computing device 150 (e.g., worker at a the product storage facility 105 (or a worker at a remote regional center) tasked with monitoring the location labels 194 on the product storage structures 115 at the product storage facility 105 to manually control the computing device 150 by inputting commands via touch-screen and/or button operation and/or voice commands. Possible commands may, for example, cause the computing device 150 to cause transmission of an alert signal to electronic mobile user device/s 160 of a worker/s at the product storage facility 105 to indicate that at least one location label 194 requires a location label check by a worker at the product storage facility.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 is not dependent on a human operator, and that the control circuit 310 of the computing device 150 may be programmed to perform such functions without a human operator.

As pointed out above, in some embodiments, the image capture device 120 moves about the product storage facility 105 (while being controlled remotely by the computing device 150 (or another remote device such one or more user devices 160), or while being controlled autonomously by the control circuit 206 of the image capture device 120), or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence and at predetermined intervals) multiple images of the product storage area 110 and the product storage structure 115 from various angles. In certain aspects, the image capture device 120 is configured to move about the product storage area 110 while capturing one or more images 180 of the product storage structure 115 at certain predetermined time intervals (e.g., every 1 second, 5 seconds, 10 seconds, etc.). The images 180 captured by the image capture device 120 may be transmitted to the electronic database 140 for storage and/or to the computing device 150 for processing by the control circuit 310 and/or to a web-/cloud-based image processing service 170.

In some aspects, the control circuit 310 of the computing device 150 obtains (e.g., from the electronic database 140, or from an image-processing internet-based service 170, or directly from the image capture device 120) one or more raw images 180 or processed images 182 of the product storage area 110 captured by the image capture device 120 while moving about the product storage area 110. In particular, in some aspects, the control circuit 310 of the computing device 150 is programmed to process a raw image 180 (captured by the image capture device 120 and obtained by the computing device 150 from the electronic database 140 or from the image capture device 120) to extract the raw image data and meta data from the image. In some aspects, the image 180 captured by the image capture device 120 may be processed via web-/cloud-based image processing service 170, which may be installed on the computing device 150 (or communicatively coupled to the computing device 150) and executed by the control circuit 310.

In some embodiments, the meta data extracted from the image 180 captured by the image capture device 120, when processed by the control circuit 310 of the computing device 150, enables the control circuit 310 of the computing device 150 to detect the physical location of the portion of the product storage area 110 and/or product storage structure 115 depicted in the image 180 and/or the physical locations and characteristics (e.g., size, shape, etc.) of the individual products 190a-190f, price tag labels 192a-192f, and/or location labels 194 depicted in the image 180. For example, with reference to FIGS. 4 and 5, in some aspects, the control circuit 310 of the computing device 150 is configured to process the data extracted from the image 180 captured by the image capture device 120 to detect the overall size and shape of each of the individual products 190a-190f, price tag labels 192a-192f, and location label 194 located on the product storage structure 115 captured in the image 180. In some embodiments, the control circuit 310 is configured to process the data extracted from the image 180 and detect each of the individual products 190a-190f, price tag labels 192a-192f, and location label 194 in the image 180 by executing one or more machine learning and/or computer vision modules and/or trained neural network modules/models 322.

In certain aspects, the neural network executed by the control circuit 310 may be a deep convolutional neural network. The neural network module/model 322 may be trained using various data sets, including, but not limited to: raw image data extracted from the images 180 captured by the image capture device 120; meta data extracted from the images 180 captured by the image capture device 120; reference image data associated with reference images of various product storage structures 115 at the product storage facility 105; reference images of various products 190a-190f stocked and/or sold at the product storage facility 105; reference images of various price tag labels 192a-192f and/or reference images of various location labels 194 applied to the product storage structures 115 at the product storage facility 105; and planogram data associated with the product storage facility 105.

In some embodiments, the control circuit 310 may be trained to process one or more images 180 of product storage areas 110 at the product storage facility 105 to detect and/or recognize one or more products 190 using one or more computer vision/machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning/neural network module/model 322 includes a computer program code stored in a memory 320 and/or executed by the control circuit 310 to process one or more images 180, as described herein. It will be appreciated that, in some embodiments, the control circuit 310 does not process the raw image 180 shown in FIG. 4 to result in the processed image 182 shown in FIG. 5, and that such processing is performed by an internet-based service 170, after which the processed image 182 is obtained by the control circuit 310 for further analysis.

With reference to the exemplary embodiment illustrated in FIG. 5, the control circuit 310 is configured to process the data extracted from the image 180 via computer vision and one or more trained neural networks to detect each of the individual products 190a-190f, price tag labels 192a-192f, and location label 194 located on the product storage structure 115 in the image 180, and to generate virtual boundary lines 195a-195f around each one of the individual products 190a-190f detected in the image 180, virtual boundary lines 197a-197f around each one of the price tag labels 192a-192f detected in the image 180, and a virtual boundary line 199 around the location label 194 detected in the image 180. As seen in the image 182 in FIG. 5, the virtual boundary lines 195a-195f extend about the outer edges of, and form a perimeter around, each of the individual products 190a-190f located on the product storage structure 115. Similarly, the virtual boundary lines 197a-197f extend about the outer edges of, and form a perimeter around, the individual price tag labels 192a-192f located on the product storage structure 115. Similarly, the virtual boundary line 199 extends about the outer edge of, and forms a perimeter around, the individual location label 194 located on the product storage structure 115.

Generally, the control circuit 310 is programmed to interpret each of the virtual boundary lines 195a-195f as surrounding only one individual product 190a-190f, to interpret each of the virtual boundary line 197a-197f as surrounding only one individual price tag label 192a-192f, and to interpret the virtual boundary line 199 as surrounding only one location label 194. In some embodiments, if the control circuit 310 is unable to detect the presence of a location label 194 on the product storage structure 115 as a result of the object detection-based analysis/processing of the image 182, the control circuit 310 is programmed to generate a missing location label alert.

In some embodiments, after generating the virtual boundary lines 195a-195f, 197a-197f, and 199 around the products 190a-190f, price tag labels 192a-192f, and location label 194, respectively, the control circuit 310 of the computing device 150 is programmed to cause the computing device 150 to transmit a signal including the processed image 182 over the network 130 to the electronic database 140 for storage. In one aspect, this image 182 may be used by the control circuit 310 in subsequent image detection operations and/or training or retraining a neural network model as a reference model of a visual representation of the product storage structure 115 and/or products 190a-190f and/or price tag labels 192a-192f and/or location label 194. More specifically, in some implementations, the control circuit 310 is programmed to perform object detection analysis with respect to images subsequently captured by the image capture device 120 by utilizing machine learning/computer vision modules/models 322 that may include one or more neural network models trained using the image data stored in the electronic database 140. Notably, in certain aspects, the machine learning/neural network modules/models 322 may be retrained based on physical inspection of the product storage structure 115 and/or products 190a-190f and/or price tag labels 192a-192f and/or location label 194 by a worker of the product storage facility 105, and in response to an input received from an electronic user device 160 of the worker.

In certain embodiments, after the control circuit 310 analyzes the one image 180 of the product storage structure 115 captured by the image capture device 120 to detect the location-identifying information (e.g., area/aisle/bay indicator, barcode, etc.) on the location label 194 located on the product storage structure 115. In some embodiments, the control circuit 310 may detect the metadata on the location label 194 detected in the image 182 by processing the location label 194 via optical character recognition (OCR). With reference to the exemplary location label 194 shown in FIG. 6A, the meta data extracted from the location label 194 as a result of the OCR processing and/or barcode scanning may include alphanumeric characters, such as words "Area," "Aisle," and "Bay," letters such as "W," numbers and special characters such as "1-2." In some embodiments, the control circuit 310 processes/analyzes the meta data extracted from the price tag labels 192a-192f to identify the barcode code, which may represent the location (e.g., name/location of the product storage facility 105 and/or area/aisle/bay on a specific product storage structure 115 at the product storage facility 105. In some embodiments, if the control circuit 310 is unable to perform OCR processing or barcode scanning of the location label 194 in the image 182 (e.g., because the price tag labels 192a-192f in the image 182 is missing (see FIG. 6B), incomplete (see FIG. 6C), deformed (see FIG. 6D), and/or partially occluded (see FIG. 6E), the control circuit 310 is programmed to generate an alert indicating that OCR processing/barcode scanning of the price tag labels 192a-192f in the image 182 was not successful.

In some embodiments, if as a result of the object detection and/or character/barcode detection as described above, the control circuit 310 detects and/or determines that the location label 194 of the product storage structure 115 is associated with an error condition (e.g., if the location label 194 is missing as shown in FIG. 6B, incomplete as shown in FIG. 6C, damaged as shown in FIG. 6C, deformed as shown in FIG. 6D, at least partially obstructed as shown in FIG. 6E, etc.), the control circuit 310 is programmed to generate a location label alert indicating that the location label 194 requires a location label check by a worker at the product storage facility 105. On the other hand, if the control circuit 310 detects and/or determines that the location label 194 of the product storage structure 115 is not associated with an error condition (e.g., if the location label 194 is present on the product storage structure 115 and all of its features such as the barcode and area/aisle/bay letters/numbers are visible as shown in FIG. 6A), the control circuit 310 is programmed to not generate a location label alert.

Figure 7:
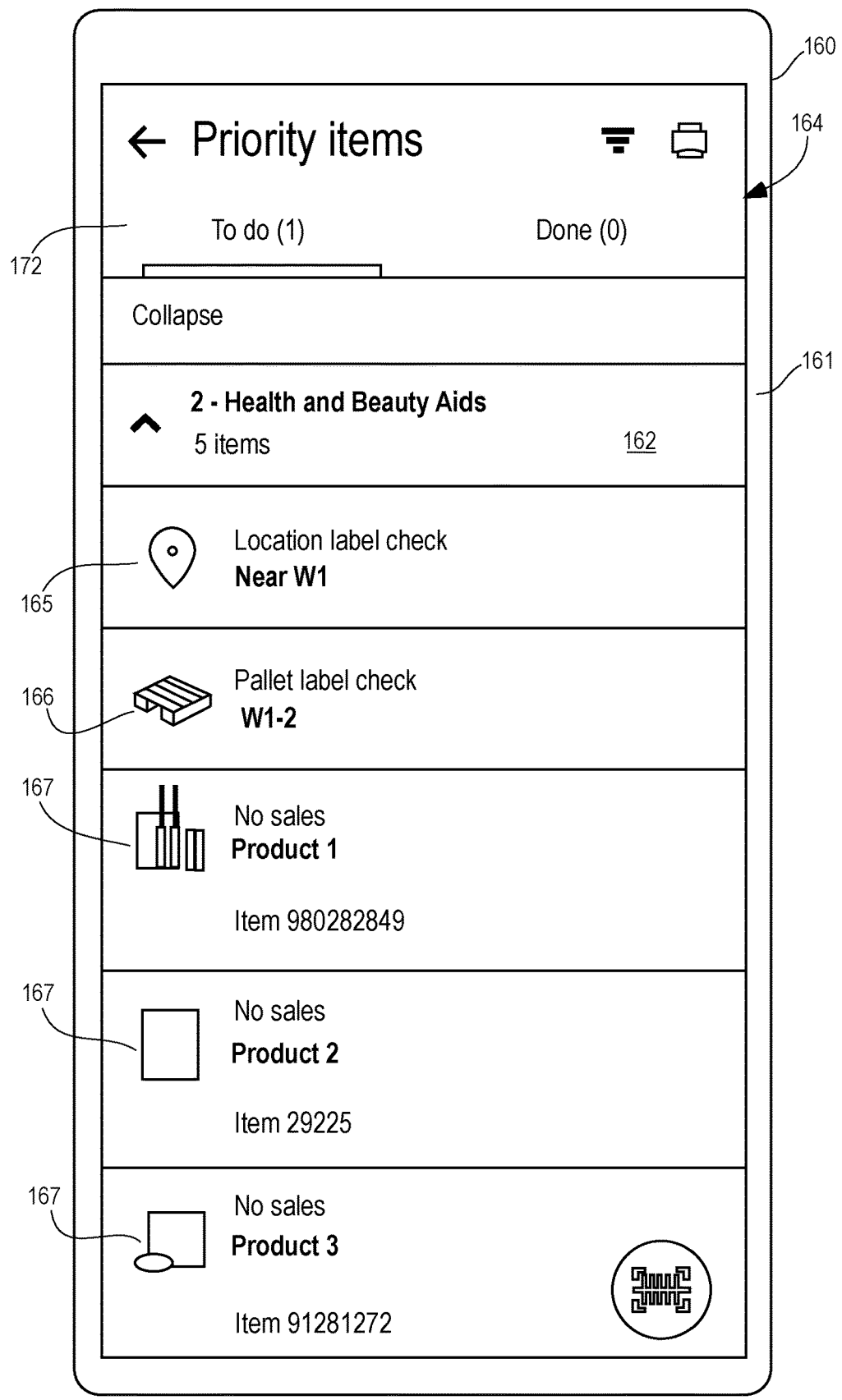
FIG. 7 is a diagram of a user device that displays a user interface according to some embodiments.
Figure 8:
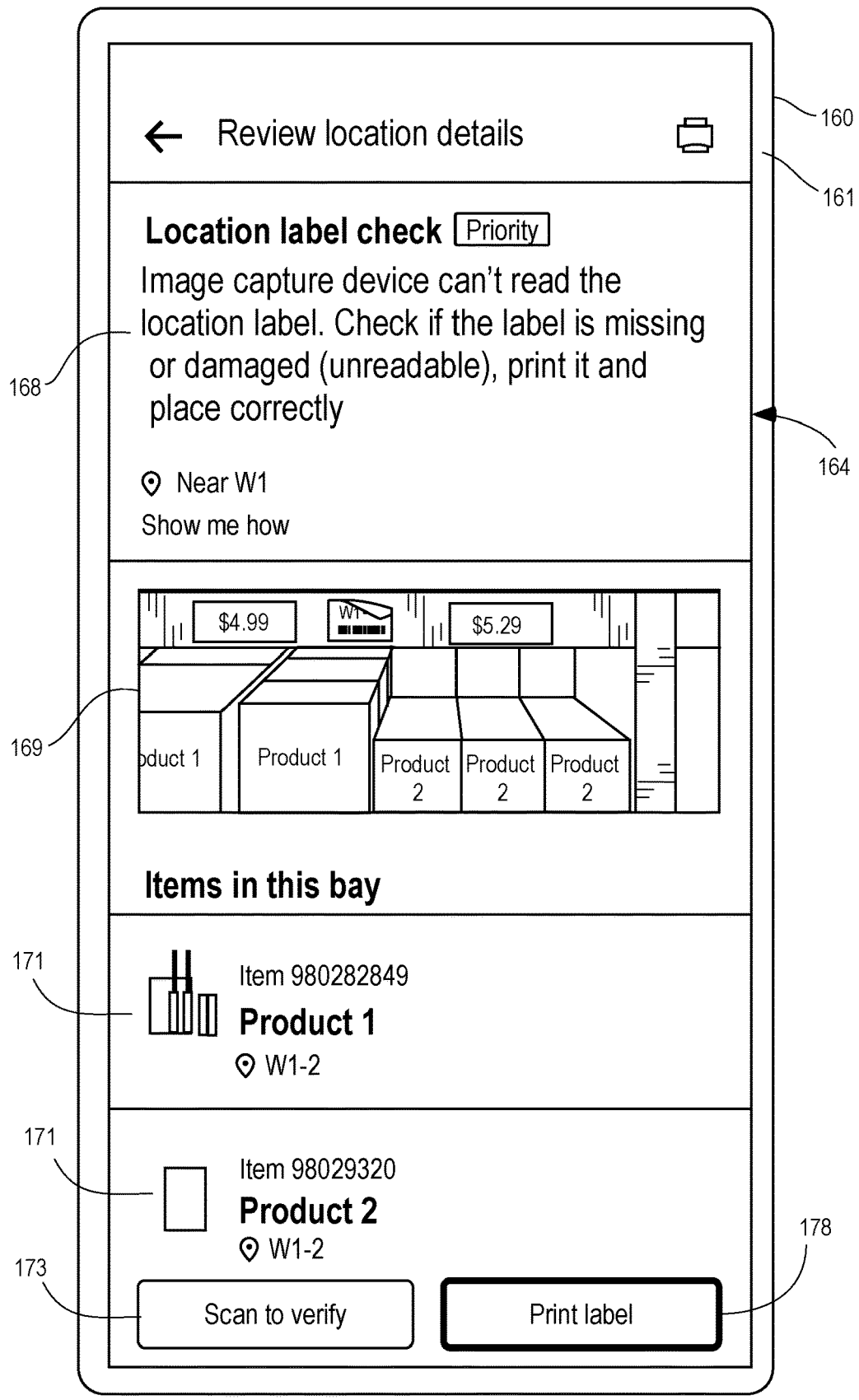
FIG. 8 is a diagram of the user device that displays the user interface according to some embodiments.
Figure 9:
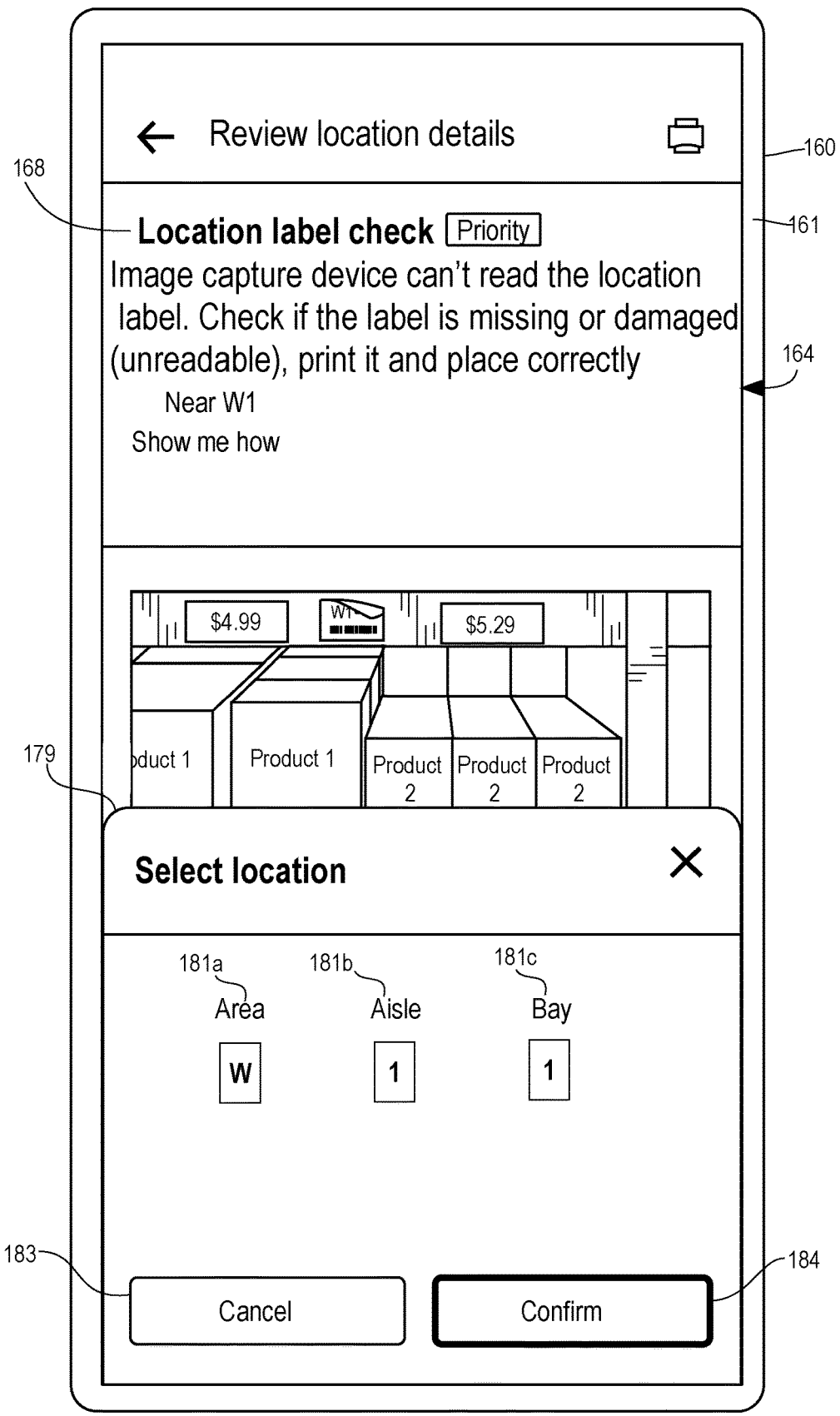
FIG. 9 is a diagram of the user device that displays the user interface according to some embodiments.

In some embodiments, the user devices 160 of the workers at the product storage facility 105 have a mobile application 162 installed thereon. In certain aspects, the user device 160 provides, via the software of the mobile application 162 (which may be a conventional application, mobile application, web browser application, etc.) a user interface 164 to the worker using the user device 160. In some aspects, the user interface 164 permits the user to view a location label alert received at the user device 160 from the computing device 150 as shown in FIG. 7. For example, in some aspects, the user interface 164 permits the user of the user device 160 to view the location (in this case, location "W1-2," which represents Area "W," "Aisle "1," Bay 2) of the product storage structure 115 associated with the location label alert, as shown in FIGS. 7-9.

In addition, as discussed in more detail with reference to FIGS. 10-11, the user interface 164 permits the user of the user device 160 to generate and either print a replacement location label 194 if the user device 160 has an onboard printer configured to print replacement labels 194 (or to output signaling to cause the replacement location label 194 to be printed by an external printer separate from, but communicatively coupled to the user device 160) for the product storage structure 115 associated with the location label alert. Notably, while FIG. 1 shows a portable printer 155 and the user device 160 as two separate physical devices, it will be appreciated that, in some embodiments, the portable printer 155 and the user device 160 may be either two separate physical devices or implemented as a single physical device (e.g., the portable user device 160 is implemented with an onboard printer 155). Furthermore, as discussed in more detail with reference to FIGS. 12-14, the user interface 164 permits the user of the user device 160 to scan the replacement location label 194 to verify that the worker affixed the printed replacement location label 194 to the product storage structure 115 associated with the location label alert.

FIG. 7 shows an exemplary user device 160 executing a mobile application 162 which, when executed, causes a user interface 164 to be displayed on a display screen 161 of the user device 160. The exemplary user interface 164 lists a single location label alert, but it will be appreciated that the user interface 164 may display a listing including more than one location label alert. In the embodiment illustrated in FIG. 7, the user interface 164 includes an informational field 165, which indicates a product storage area 110 (in this exemplary case, area W, aisle 1, displayed as "Near W1" in FIG. 7), for which a location label alert (displayed in the form of a message called "Location label check" in FIG. 7) was generated. In the illustrated embodiment, the exemplary user interface 164 also includes an informational field 172, which indicates the location label check tasks that a worker is assigned to perform (indicated by the message "To do," which in this case shows a numerical value "1" in parentheses, indicating that the worker has to perform one location label check), as well as the location label check tasks that a worker has successfully performed (indicated by the message "Done," which in this case shows a numerical value "0" in parentheses, indicating that the worker has not completed any location label checks).

In addition, the exemplary user interface 164 includes an informational field 166, which indicates the specific product storage structure 115 associated with the location label alert, in this example, the specific location being a pallet (reflected by the message "Pallet label check" in FIG. 7) located in area W, aisle 1, Bay 2 (displayed as "W1-2" in FIG. 7). For example, if the product storage structure 115 associated with the location label alert was a shelf rack, a display case, featured item rack, the information field 166 may display a message such as "Shelf label check," "Shelf cabinet label check," "Display item label check," "Featured item label check," or the like.

In the embodiment illustrated in FIG. 7, the user interface 164 further includes informational fields 167, which display a listing of the names (i.e., "Product 1," "Product 2," and "Product 3" visible in FIG. 4) and unique identifiers (displayed in the form of unique Item Numbers in FIG. 7) of the products 190*a*-190*c* stored on the product storage structure 115 associated with the location label alert displayed within the user interface 164. In some embodiments, the informational fields 167 may display a consumer demand for each of the products 190*a*-190*c* (displayed as the message "No sales" in the example illustrated in FIG. 7, but could be displayed in the form of a number of units of each product 190*a*-190*c* sold/removed from the product storage structure 115). In situations when the product storage structure 115 stores more than three products (e.g., six products 190*a*-190*f* as shown in FIG. 4), the user interface 164 may be expanded by a user interaction with the display screen 161 of the user device 160 to reveal a display of additional informational fields 167 that indicate product and/or consumer demand information associated with the other three products (e.g., 190*d*-190*f,* named "Product 4," "Product 5," and "Product 6" in FIG. 4) stored on the product storage structure 115 associated with the location label alert.

In some embodiments, at least one portion of each of informational field 165 and 166 is interactive to permit a worker to select (e.g., by clicking, tapping, swiping, etc. on the screen 161 of the user device 160) the location label alert displayed within the informational fields 165 and 166. FIG. 8 shows an exemplary user interface 164 that is displayed on a display screen 161 of the user device 160 in response to a user selecting a location label alert (e.g., the location label alert displayed within the informational field 165) of the user interface 164 of FIG. 7. In the example provided in FIG. 8, the user interface 164 includes an informational field 168 that indicates one or more error conditions that gave rise to the generation of the location label alert (in the illustrated exemplary case, the error condition being that the image capture device 120 was unable to read the location label 194), as well as a message to the worker that provides an instruction to the worker (in the illustrated exemplary case, an instruction to the worker to check if the location label 194 is missing or damaged, print it, and place correctly).

In the embodiment illustrated in FIG. 8, the user interface 164 includes further an informational field 169 that displays an image representing a portion of the image 180 (seen in FIG. 4) of the product storage structure 115 associated with the location label alert selected by the worker. In some aspects, the portion of the image displayed within the informational field 169 is configured to be interactive, such that a selection (e.g., clicking, tapping, swiping, etc.) of the image within the informational field 169 by a worker causes the user interface 164 to display the full image 180 (as seen in FIG. 4) of the product storage structure 115. In certain implementations, when the user interface 164 displays the full image 180 of the product storage structure 115 as seen in FIG. 4, the full image 180 displayed within the user interface is configured to be interactive, such that a worker is permitted to interact with (e.g., single tap, drag, double tap, swipe up/down etc.) to zoom in on portions of the full image 180 and/or move around the full image 180 within the user interface 164 to focus on portion of the full image 180 of interest to the worker. In certain implementations, the user interface 164 may display an informational message to the worker (e.g., "Tap to zoom in," etc.) to inform the worker of the interactivity of the full image 180 displayed within the interface 164.

Similar to the embodiment of the user interface 164 shown in FIG. 7, the embodiment of the user interface 164 shown in FIG. 8 includes informational fields 171, which display a listing of the names (i.e., "Product 1" and "Product 2" are visible in FIG. 8), unique identifiers (i.e., unique Item Numbers (e.g., 980282849 and 98029320) are visible in FIG. 8), and location (displayed in the form of "W1-2" in FIG. 8) of the products 190*a*-190*b* stored on a product storage structure 115 associated with the location label alert displayed within the user interface 164. In situations when the product storage structure 115 stores more than two products (e.g., six products 190*a*-190*f* as shown in FIG. 4), the user interface 164 may be expanded by a user interaction with the display screen 161 of the user device 160 to reveal a display of additional informational fields 171 that indicate the names and unique identifiers of additional products (e.g., products 190*c*-190*f,* named "Product 3," "Product 4," "Product 5," and "Product 6" visible in FIG. 4) that are stored on the product storage structure 115 associated with the location label alert.

In the embodiment illustrated in FIG. 8, the exemplary user interface 164 further includes an interactive user-selectable field 173 (e.g., an icon, button, link, etc.) called "Scan to Verify," which, when selected (e.g., clicked, tapped, etc.) by the worker, causes the user interface 164 to generate and display an interactive location label scanning feature 175 shown in FIG. 12, which will be discussed in more detail below. In addition, the user interface 164 shown in FIG. 8 further includes an interactive user-selectable field 178 (e.g., an icon, button link, etc.) called "Print label," which, when selected (e.g., clicked, tapped, etc.) by the worker, causes the user interface 164 to generate and display an interactive "Select location" feature 179, shown in FIG. 9.

With reference to FIG. 9, the exemplary "Select location" feature 179 of the user interface 164 may be in the form of a pop-up menu that overlays a portion of the user interface 164 shown in FIG. 8 (in the illustrated embodiment, overlaying the informational fields 171 and the user-selectable fields 173 and 178, which are visible in FIG. 8). In some embodiments, the "Select location" feature 179 generated within the user interface 164 indicates the general area of the product storage facility 105 (in this case, area "W") detected within the user interface 164 of FIG. 8 as being associated with the location label alert, and displays a starting default value of W1-1 (i.e., area "W," aisle "1" and "Bay 1"), which the worker is able to modify to display the location (i.e., "W1-2") desired by the worker by interacting (e.g., tapping, swiping, etc.) with the user interface 164 via the display 161 of the user device 160. In one aspect, each of the default values "W," "1," and "1" displayed under "Area," "Aisle," and "Bay," respectively, are displayed in the form of interactive, user-modifiable fields 181*a*, 181*b*, 181*c*, respectively, which may be changed by the worker by swiping down on the display screen 161 to scroll down from the default value to the worker-desired value (in this case, the worker would interact with the user-modifiable field 181*c* to scroll down from the default value "1" in the "Bay" column to the value "2," permitting the worker to select the location "W1-2," which is associated with the location label alert.

In the embodiment illustrated in FIG. 9, the user interface 164 further includes an interactive user-selectable field 183 (e.g., an icon, link, etc.) called "Cancel," which, when selected (e.g., clicked, tapped, etc.) by the worker, causes the user interface 164 to close/exit out of the "Select location" feature 179. In addition, the exemplary user interface 164 illustrated in FIG. 9 further includes an interactive user-selectable field 184 (e.g., an icon, link, etc.) called "Confirm," which, when selected (e.g., clicked, tapped, etc.) by the worker, causes the user interface 164 to generate and display an interactive "Print label" feature 185, shown in FIG. 10.

Figure 10:
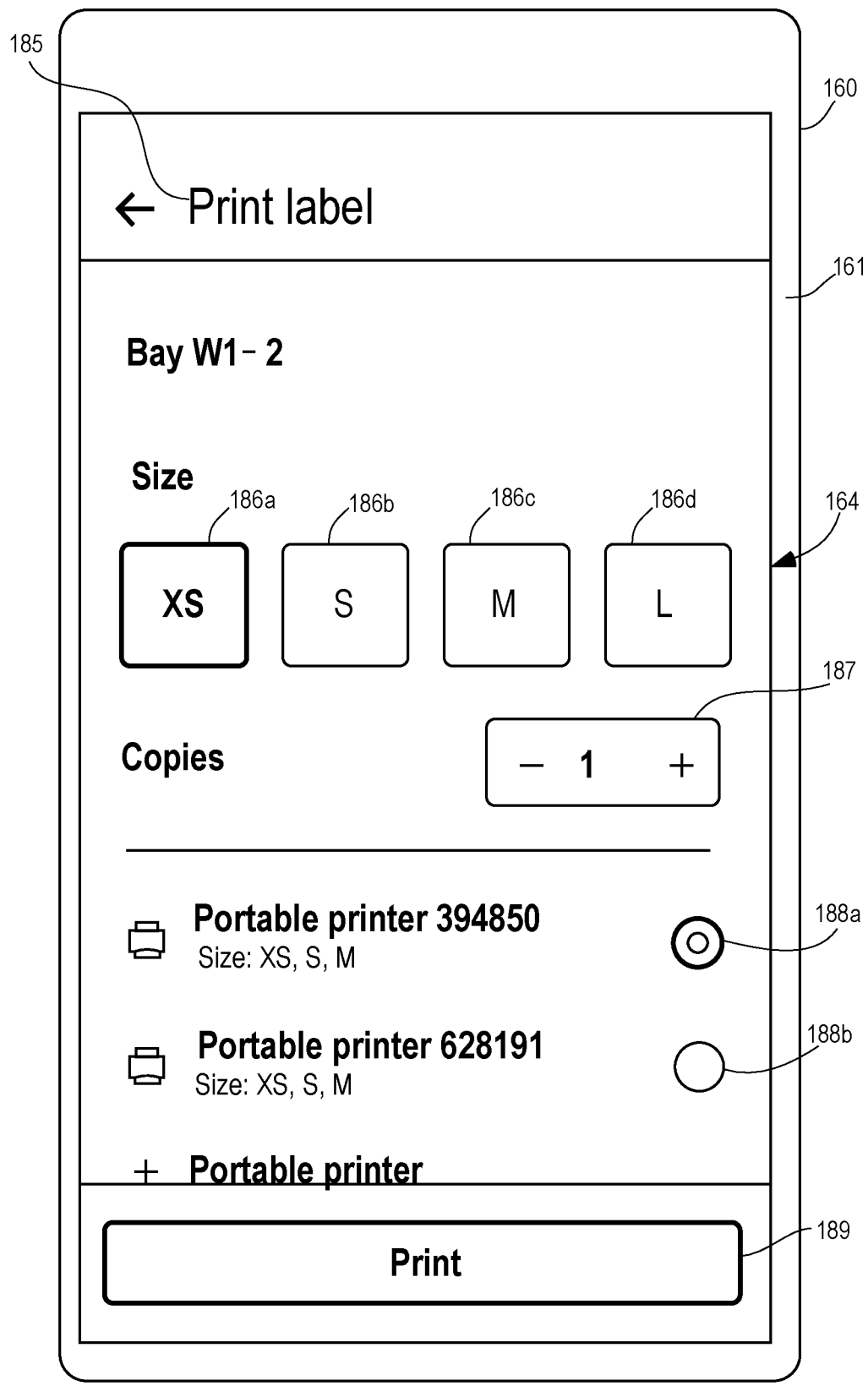
FIG. 10 is a diagram of the user device that displays the user interface according to some embodiments.

With reference to FIG. 10, the exemplary "Print label" feature 185 of the user interface 164 may include an informational field indicating the area/aisle/bay location, in this case, location "W1-2," which is associated with the location label alert. In addition, in the embodiment illustrated in FIG. 10, the "Print label" feature 185 of the user interface 164 may include user-selectable fields 186*a*, 186*b*, 186*c*, and 186*d* (e.g., icons, links, etc.) called "XS," "S," "M," and "L," respectively, which, when selected (e.g., clicked, tapped, etc.) by the worker, permit the worker to select the worker-desired size (e.g., extra small, small, medium, and large, respectively) of the location label 194 to be printed. The user interface 164 shown in FIG. 10 further includes a user-selectable field 187 (e.g., a text input field that may provide for a manual entry of numbers and/or plus/minus buttons, etc.), which, when selected (e.g., clicked, tapped, etc.) by the worker, permits the worker to select the number of copies of the location label 194 to be printed.

The user interface 164 shown in FIG. 10 further includes-selectable fields 188*a* and 188*b* (there may be more if there are more than two printer options available to the worker within the user interface 164), which, when selected (e.g., clicked, tapped, etc.) by the worker, permit the worker to select the specific external (e.g., portable, stationary, etc.) printer to which to send (e.g., via a wired or a wireless connection) a signal output for printing the replacement location label 194. Notably, as mentioned above, in some embodiments, instead of being communicatively coupled via a wired or wireless connection to a separate external printer that prints the replacement location label 194, the user device 160 may be configured as a single device having an onboard printer that prints the replacement location label 194. In addition, the exemplary user interface 164 illustrated in FIG. 10 further includes an interactive user-selectable field 189 (e.g., an icon, button, link, etc.) called "Print" which, when selected (e.g., clicked, tapped, etc.) by the worker, causes the user interface 164 to generate and output signaling to the worker-selected printer to print the replacement location label 194, and causes the user interface 164 to proceed to the "Review location details" feature 1090, shown in FIG. 11.

Figure 11:
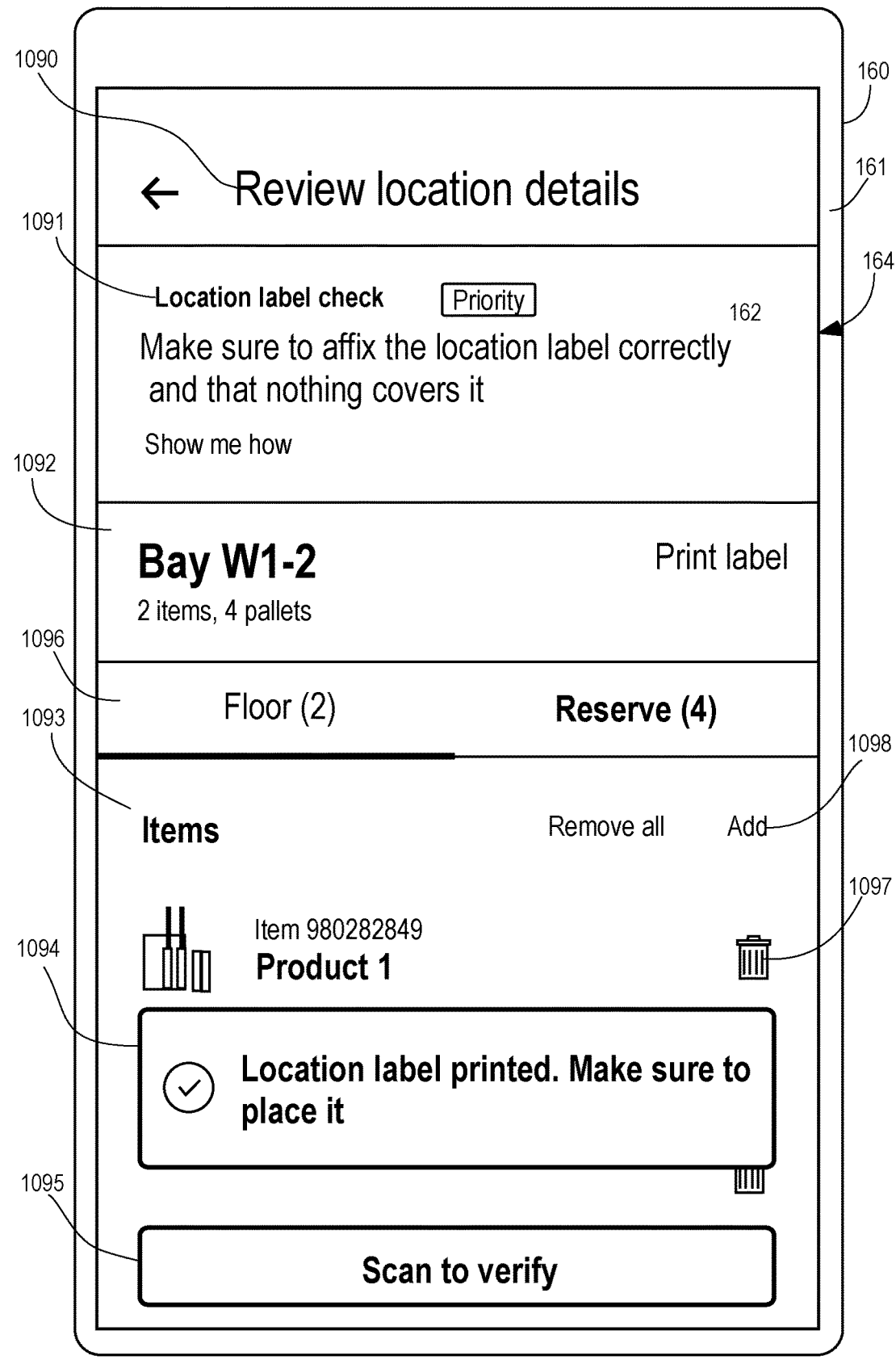
FIG. 11 is a diagram of the user device that displays the user interface according to some embodiments.

The exemplary "Review location details" feature 1090 of the user interface 164 shown in FIG. 11 includes an informational field 1091 relating to the location label check being performed by the worker, and indicating an informational message to the worker (in the illustrated embodiment, an instruction to the worker to make sure to affix the location label 194 correctly and that nothing covers it). The exemplary user interface 164 shown in FIG. 11 further includes an informational field 1092, indicating the product storage area 110 (in this case, "W1-2," i.e., area "W," aisle "1," and bay "2") for which the replacement location label 194 is being printed. In the illustrated embodiment, the exemplary informational field 1092 of the user interface 164 further includes an indicator (in this example, indicating "2 items") of how many products 190*a*-190*f* within area/aisle/bay W1-2 are reachable by the customers for placement into their shopping cart, as well as an indicator (in this example, indicating "4 pallets") of how many product storage structures 115 are located in area W1-2. In the example shown in FIG. 11, the user interface 164 further includes an informational field 1096, indicating how many products 190*a*-190*f* (in this case "(2)") are available on the sales floor of the product storage facility 105 and reachable by the customers to purchase, as well as how many products 190*a*-190*f* (in this case, "(4)") are in reserve at the product storage facility 105.

Similar to the embodiment of the user interface 164 shown in FIG. 8, the embodiment of the user interface 164 shown in FIG. 11 includes an informational field 1093, which displays a listing of the names (i.e., only the name "Product 1" is visible in FIG. 11) and unique identifiers (displayed in the form of a unique Item Number "980282849" in FIG. 11) of the products (in the case of FIG. 11, product 190*a*) stored on a product storage structure 115 associated with the location label alert displayed within the user interface 164. In addition, the informational field 1093 further includes interactive user-selectable fields 1097 and 1098 (e.g., icons, buttons, links, etc.) which, when selected (e.g., clicked, tapped, etc.) by the worker, permit the worker to manually add or remove one or more of the products 190*a*-190*f* from the product listing in informational field 1093.

For example, if, after arriving at and visually inspecting the product storage location W1-2, the worker notices that Product 1, which was visible in the image of location W1-2 that was displayed to the worker in informational field 169 of the user interface 164 (see FIG. 8), is no longer present at the location W1-2 (e.g., because customers removed all units of Product 1 from W1-2 prior to the worker arriving at location W1-2, the worker can tap/click the interactive button 1097 (displayed in the example provided in FIG. 11 as a trash can) to remove Product 1 from the listing in informational field 1093 to reflect that no units of Product 1 are actually present in location W1-2. On the other hand, if the worker notices that location W1-2 includes a product that was not visible in the image of the location W1-2 displayed to the worker in informational field 169 of the user interface 164, the worker can tap/click the interactive button 1098 (displayed in the example provided in FIG. 11 as "Add") to add the product noticed by the worker into the listing in informational field 1093 to reflect that location W1-2 actually stores this additional product.

The exemplary user interface 164 shown in FIG. 11 includes an informational field 1094, which overlays a portion of the informational field 1093, and which may provide a message/notification to the worker that the location label 194 has been printed, and may also display instructions to the worker in association with the printed replacement location label 194 (in this case, "make sure to place it"). Furthermore, the exemplary user interface 164 shown in FIG. 11 includes an interactive user-selectable field 1095 (e.g., an icon, link, etc.) called "Scan to Verify," which, when selected (e.g., clicked, tapped, etc.) by the worker, causes the user interface 164 to generate and display an interactive location label scanning feature 175 shown in FIG. 12.

Figure 12:
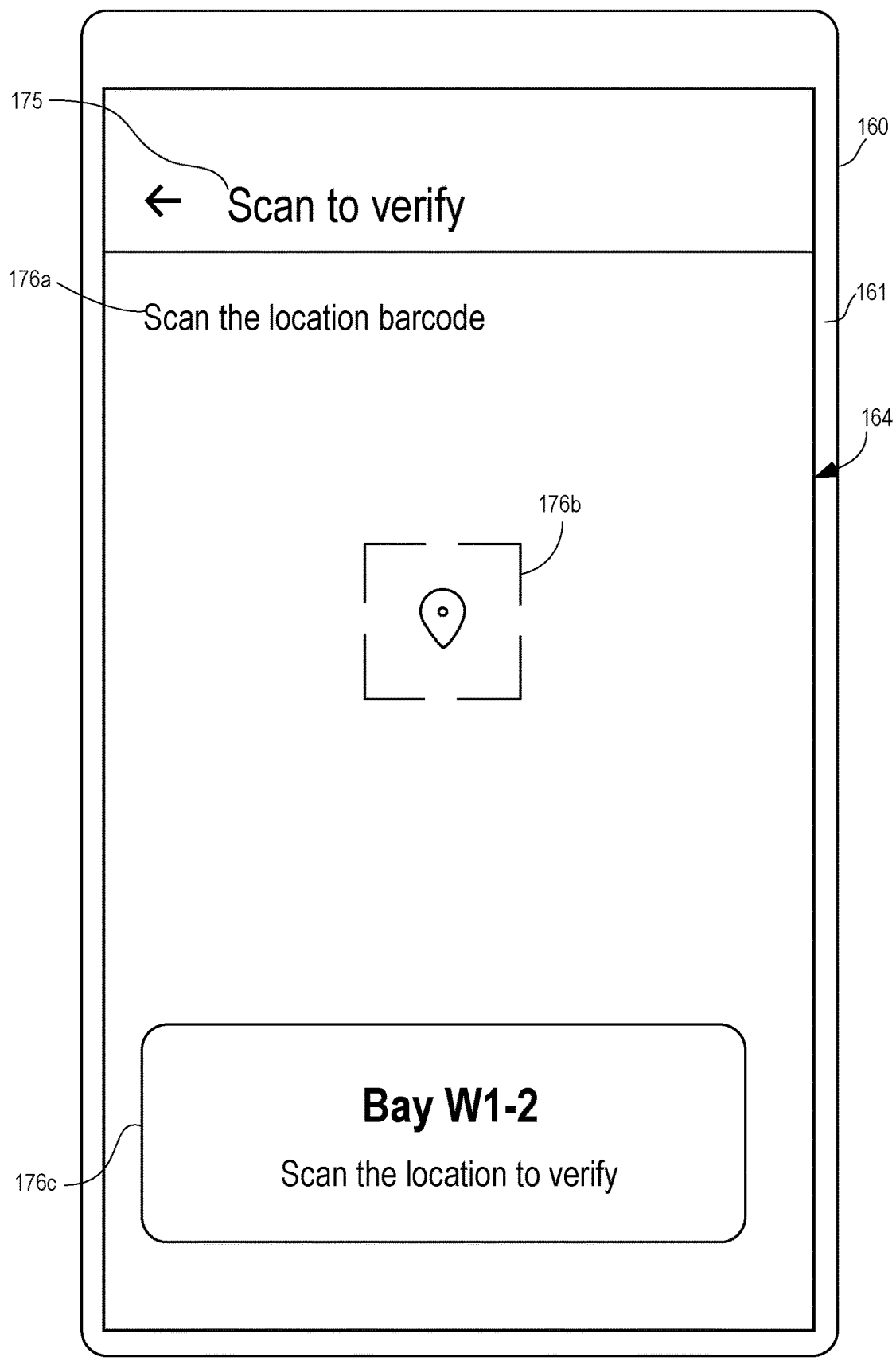
FIG. 12 is a diagram of the user device that displays the user interface according to some embodiments.
Figure 13:
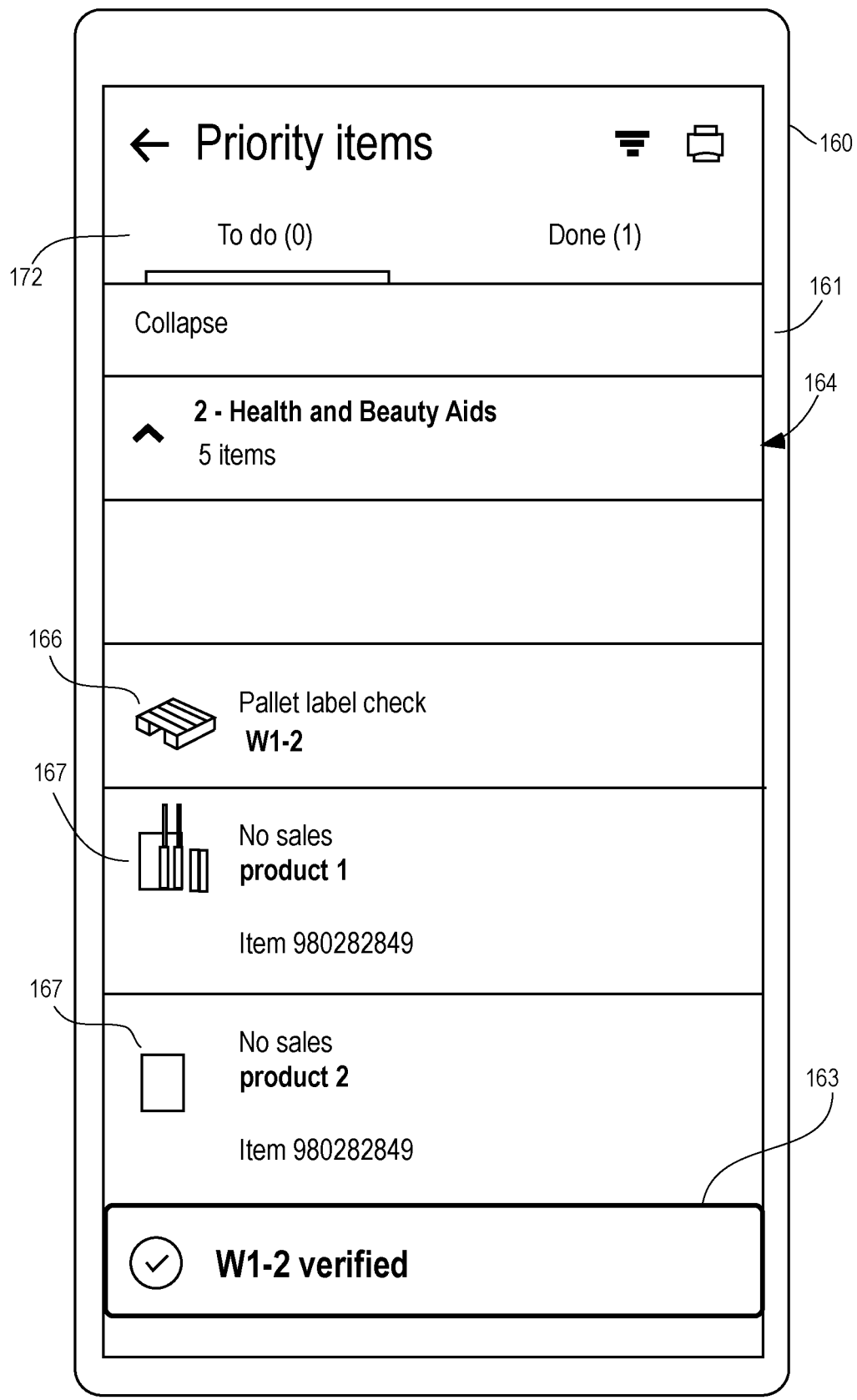
FIG. 13 is a diagram of the user device that displays the user interface according to some embodiments.

With reference to FIG. 12, the label scanning feature 175 of the exemplary user interface 164 includes an informational field 176a that provides a message/notification to the worker, in this example, an instruction to the worker to scan the barcode of the replacement location label 194 after the worker has printed out the replacement location label 194 and placed it on the appropriate location on the product storage structure 115. In addition, the label scanning feature 175 of the exemplary user interface 164 includes a barcode scanner 176b, which may be pointed at a barcode of the replacement location label 194 to read the barcode on the replacement location label 194 and retrieve the identifying information encoded by the barcode of the replacement location label 194. The label scanning feature 175 of the exemplary user interface 164 depicted in FIG. 12 further includes an informational field 176c that provides a message/notification to the worker, in this example, an indication of the location (in this case, "W1-2," i.e., area "W," aisle "1," and bay "2") for which the replacement location label 194 was printed, as well as an instruction to the worker to scan the barcode of the replacement location label 194 to verify that the worker has placed the replacement location label 194 at the appropriate location on the product storage structure 115.

In some embodiments, if the barcode of the replacement location label 194 was not successfully scanned by the barcode scanner 176b, the user interface 164 is configured to generate an error message, notifying the worker that the location label 194 is not scannable, and instructing the user to manually select the location where the replacement location label 194 was placed. In one embodiment, the generated error message is in the form of a pop-up window that includes an interactive user-selectable field (e.g., button, icon, link, etc.) that, when interacted with by the worker (e.g., by tapping, etc.), generates the Select location feature 179 shown in FIG. 9, which permits the worker to manually select the location (e.g., "W1-2") where the replacement location label 194 was placed by the worker.

In some embodiments, if the worker mistakenly scans a barcode of a location label (e.g., "W1-3") that is different from the "W1-2" replacement label 194 printed by the worker, the user interface 164 generates an error message to the worker, instructing the worker to scan the replacement label 194 at location "W1-2." In some embodiments, if the worker mistakenly scans a barcode that is not associated with a location label (e.g., a barcode of a product 190a or a price tag label 192a), the user interface 164 generates an error message to the worker, instructing the worker to scan the barcode of a location label 194.

In some embodiments, in response to a worker scanning the replacement location label 194 with the barcode scanner 176b of the user interface 164, the user interface generates a confirmation that the placement of the replacement location label 194 onto the product storage structure 115 has been verified (i.e., by scanning the barcode of the replacement location label 194 with the barcode scanner 176b). In the embodiment shown in FIG. 13, the exemplary user interface 164 is similar to the user interface 164 illustrated in FIG. 7, but further includes an informational field 163 that visually confirms to the worker (e.g., by including a checkmark and the words "W1-2 verified") that the placement of the replacement location label 194 onto the product storage structure 115 was successfully verified, either by the worker scanning the barcode of the replacement location label 194 with the barcode scanner 176b, or by manually entering the location W1-2 using the Select location feature 179. In the illustrated embodiment, since the worker successfully verified the placement of one replacement location label 194 onto the product storage structure 115, the informational field 172 of the user interface 164 is updated to indicate that the worker completed one location label check task (indicated by the message "To do," in this case showing a numerical value "0" in parentheses and indicating that the worker is not assigned any location label checks to performed, and indicated by the message "Done," in this case showing a numerical value "0" in parentheses, indicating that the worker completed one location label check).

Figure 14:
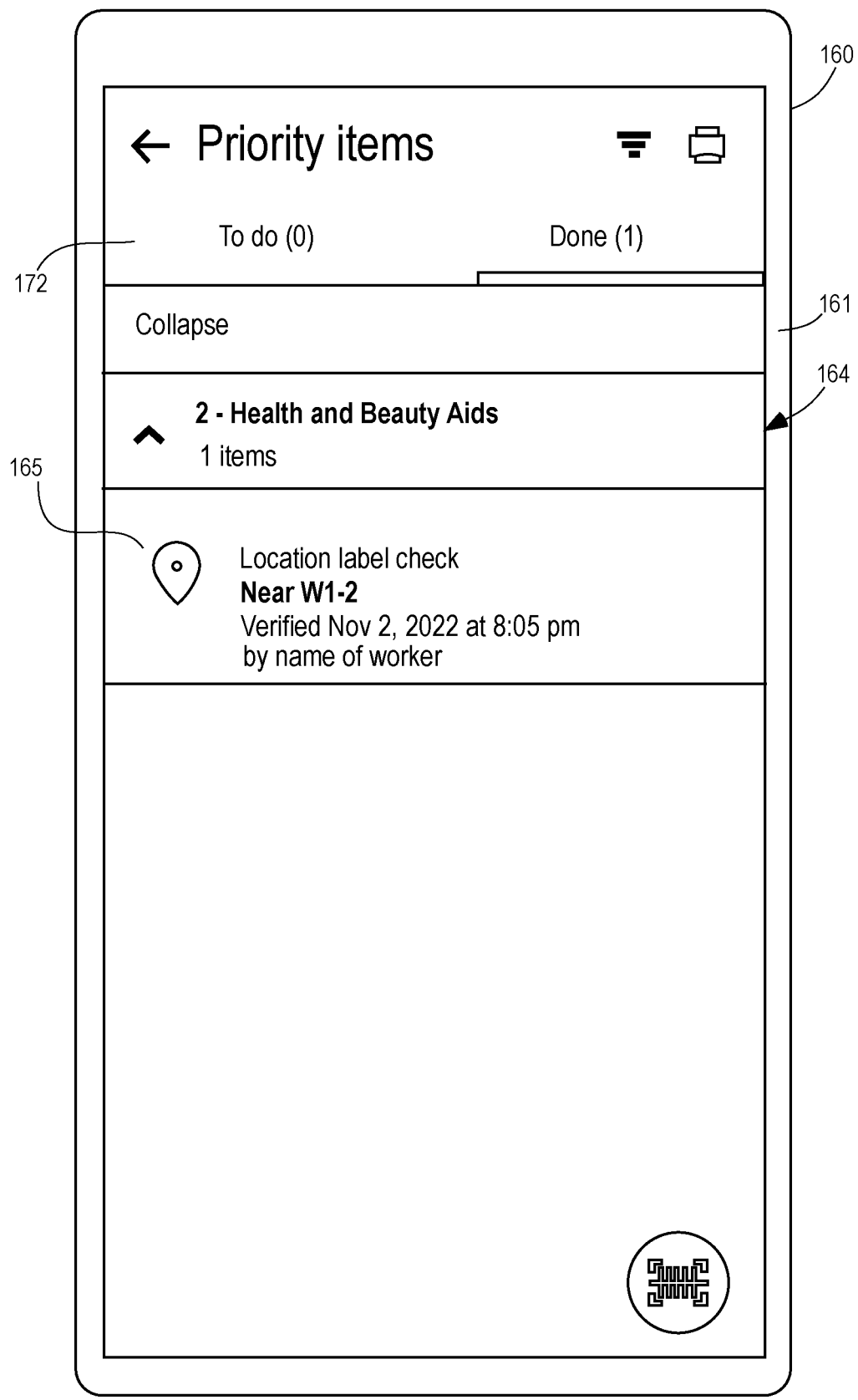
FIG. 14 is a diagram of the user device that displays the user interface according to some embodiments.

In the embodiment shown in FIG. 14, the exemplary user interface 164 is similar to the user interface 164 illustrated in FIG. 7, but the informational field 165 is updated to visually confirm to the worker (e.g., by including the date and time verified, as well as the name of the worker performing the verification) that the placement of the replacement location label 194 onto the product storage structure 115 was successfully verified by the worker.

Figure 15:
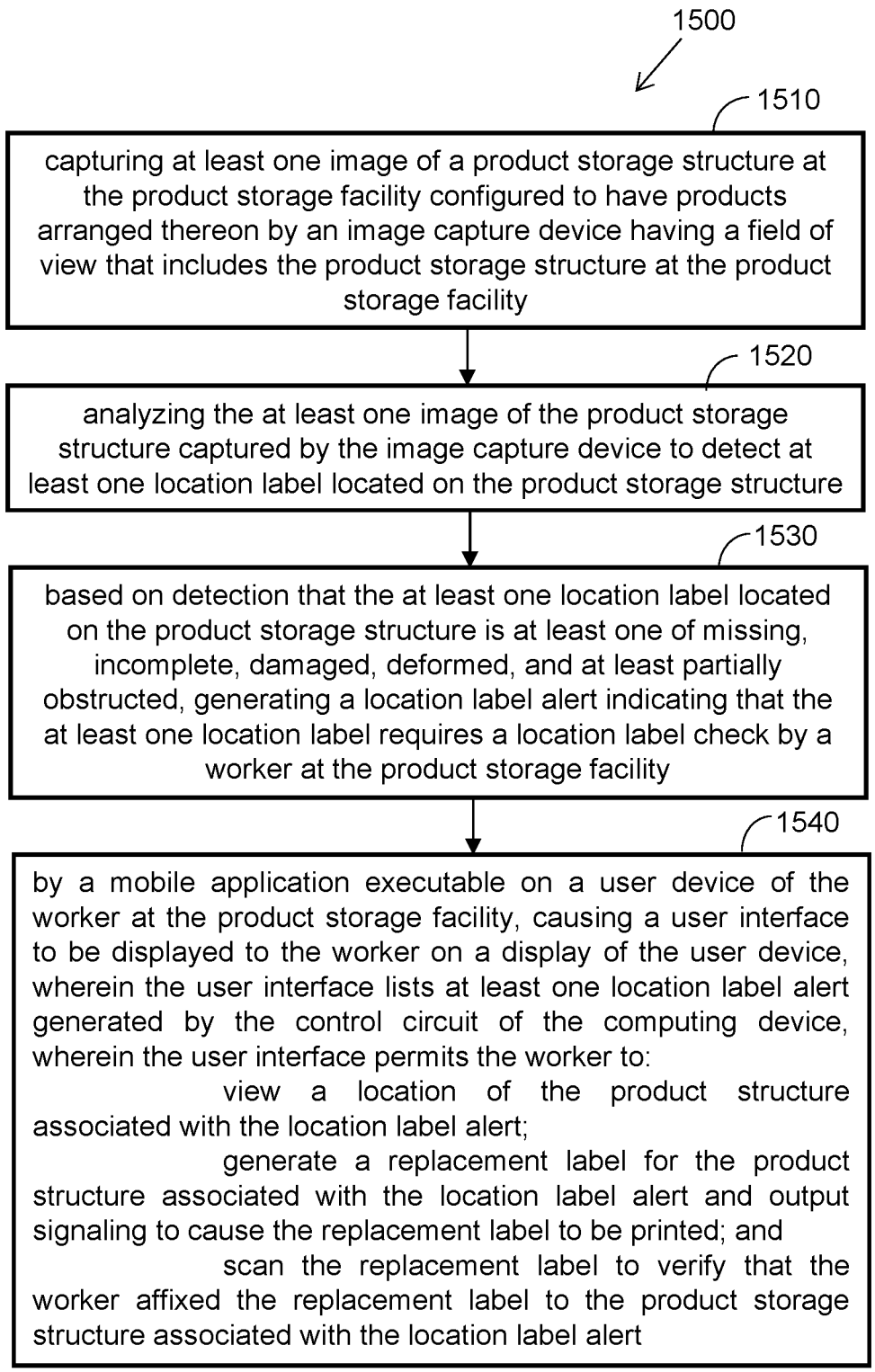
FIG. 15 is a flow diagram of an exemplary process of monitoring location labels on product storage structures of a product storage facility in accordance with some embodiments.

With reference to FIG. 15, an exemplary method 1500 of operation of the system 100 for monitoring location labels 194 on product storage structures 115 of a product storage facility 105 is described. The method 1500 includes capturing at least one image 180 of a product storage structure 115 at the product storage facility 105 configured to have products 190a-190f arranged thereon by an image capture device 120 having a field of view that includes the product storage structure 115 at the product storage facility 105 (step 1510). In some aspects, the image capture device 120 moves about the product storage facility 105 (while being controlled remotely by the computing device 150 (or another remote device such one or more user devices 160)), or while being controlled autonomously by the control circuit 206 of the image capture device 120), or while being manually driven or pushed by a worker of the product storage facility 105.

When the image capture device 120 moves about the product storage area 110 as shown in FIG. 1, the sensor 214 of the image capture device 120, which may be one or more digital cameras, captures (in sequence and at predetermined intervals) multiple images of the product storage area 110 and the product storage structure 115 from various angles. As pointed out above, the image capture device 120 may move about the product storage area 110 while capturing images 180 of the product storage structure 115 at predetermined time intervals (e.g., every 1 second, 5 seconds, 10 seconds, etc.), and the images 180 captured by the image capture device 120 may be transmitted to the electronic database 140 for storage and/or to the computing device 150 for processing by the control circuit 310 and/or to a web-/cloud-based image processing service 170.

The method 1500 of FIG. 15 further includes several actions performed by a computing device 150 including a control circuit 310 and communicatively coupled to the image capture device 120. As pointed out above, the computing device 150 may obtain the image 180 captured by the image capture device 120 directly from the image capture device 120 (e.g., over the network 130 via the wireless transceiver 212 of the image capture device and the input/output 340 of the computing device 150), or from the electronic database 140 (e.g., over the network 130 via the input/output 340 of the computing device over the network 130), or from an internet-based service 170 (which may process the image 180 as described above to result in the image 182, such that, in step 1520, the computing device 150 does not obtain the raw image 180, but obtains the processed image 182).

In the illustrated embodiment, after the control circuit 310 obtains the image 180, the method 1500 further includes the control circuit 310 of the computing device 150 analyzing the image 180 of the product storage structure 115 captured by the image capture device 120 to detect at least one location label 194 located on the product storage structure 115 (step 1520). As pointed out above, in some embodiments, the control circuit 310 may analyze the images 180 to detect: (1) each of the individual products 190*a*-190*f* located on the product storage structure 115 in the image 180, and to generate virtual boundary lines 195*a*-195*f* (seen in FIG. 5) around each one of the individual products 190*a*-190*f* detected in the image 180; (2) each of the individual price tag labels 192*a*-192*f* located on the product storage structure 115 in the image 180, and to generate virtual boundary lines 197*a*-197*f* (seen in FIG. 5) around each one of the individual price tag labels 192*a*-192*f* detected in the image 180; and/or (3) each individual location label 194 located on the product storage structure 115 in the image 180, and to generate a virtual boundary line 199 (seen in FIG. 5) around each individual location label 194 detected in the image 180.

With reference to FIG. 15, after the control circuit 310 analyzes the raw image 180 and/or the processed image 182 to detect at least one individual location label 194 on the product storage structure 115, the exemplary method 1500 further includes, based on detection by the control circuit 310 of the computing device 150 that the location label 194 located on the product storage structure 115 is missing, incomplete, damaged, deformed, and/or at least partially obstructed, generating by the control circuit 310 a location label alert indicating that the location label 194 requires a location label check by a worker at the product storage facility 105 (step 1530). As discussed above, in some embodiments, the control circuit 310 transmits this location label alert over the network 130 to a user device 160 of a worker of the product storage facility 105, and the user device 160 is configured to execute a mobile application 162 thereon.

In the illustrated embodiment, the method 1500 includes the mobile application 162 executable on the user device 160 of the worker at the product storage facility 105 causing a user interface 164 to be displayed to the worker on a display 161 of the user device 160 (step 1540). As discussed in more detail above, in some embodiments, the user interface 164 lists at least one location label alert generated by the control circuit 310 of the computing device 150, and permits the worker to at least one of: view a location of the product storage structure 115 associated with the location label alert, generate a replacement location label 194 for the product storage structure 115 associated with the location label alert and output signaling to cause the replacement location label 194 to be printed; and scan the replacement location label 194 to verify that the worker affixed the replacement location label 194 to the product storage structure 115 associated with the location label alert. As discussed above, the user device 160 may be communicatively coupled via a wired or wireless connection to a separate external printer that prints the replacement location label 194, or may be configured as a single device having an onboard printer that prints the replacement location label 194.

The above-described exemplary embodiments advantageously provide for inventory management systems and methods, where the location labels located on the product storage structures of product storage facilities of a retailer can be efficiently detected and checked for error conditions (and replacement location labels printed, if needed). As such, the systems and methods described herein provide for an efficient and precise monitoring of location labels on product storage structures of a product storage facility and provide a significant cost savings to the product storage facility by saving the product storage facility thousands of worker hours that would be normally spent by the workers on manual inspection of product storage structure to check the presence and/or condition of location labels.

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; entitled CLUSTERING OF ITEMS WITH HETEROGENEOUS DATA POINTS filed on Oct. 11, 2022, application Ser. No. 17/963,903; entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751; entitled SYSTEMS AND METHODS OF MAPPING AN INTERIOR SPACE OF A PRODUCT STORAGE FACILITY filed on Oct. 14, 2022, application Ser. No. 17/966,580; entitled SYSTEMS AND METHODS OF DETECTING PRICE TAGS AND ASSOCIATING THE PRICE TAGS WITH PRODUCTS filed on Oct. 21, 2022, application Ser. No. 17/971,350; entitled SYSTEMS AND METHODS OF VERIFYING PRICE TAG LABEL-PRODUCT PAIRINGS filed on Nov. 9, 2022, application Ser. No.

17/983,773; entitled SYSTEMS AND METHODS OF USING CACHED IMAGES TO DETERMINE PRODUCT COUNTS ON PRODUCT STORAGE STRUCTURES OF A PRODUCT STORAGE FACILITY filed Jan. 24, 2023, application Ser. No. 18/158,969; entitled METHODS AND SYSTEMS FOR CREATING REFERENCE IMAGE TEMPLATES FOR IDENTIFICATION OF PRODUCTS ON PRODUCT STORAGE STRUCTURES OF A RETAIL FACILITY filed Jan. 24, 2023, application Ser. No. 18/158,983; entitled SYSTEMS AND METHODS FOR PROCESSING IMAGES CAPTURED AT A PRODUCT STORAGE FACILITY filed Jan. 24, 2023, application Ser. No. 18/158,925; and entitled SYSTEMS AND METHODS FOR PROCESSING IMAGES CAPTURED AT A PRODUCT STORAGE FACILITY filed Jan. 24, 2023, application Ser. No. 18/158,950; entitled SYSTEMS AND METHODS FOR ANALYZING AND LABELING IMAGES IN A RETAIL FACILITY filed Jan. 30, 2023, Application No. ; entitled SYSTEMS AND METHODS FOR ANALYZING DEPTH IN IMAGES OBTAINED IN PRODUCT STORAGE FACILITIES TO DETECT OUTLIER ITEMS filed Feb. 6, 2023, Application No. ; entitled SYSTEMS AND METHODS FOR REDUCING FALSE IDENTIFICATIONS OF HAVING SIMILAR APPEARANCES IN IMAGES OBTAINED IN PRODUCT STORAGE FACILITIES filed Feb. 13, 2023, Application No. ; entitled SYSTEMS AND METHODS FOR IDENTIFYING DIFFERENT PRODUCT IDENTIFIERS THAT CORRESPOND TO THE SAME PRODUCT filed Feb. 13, 2023, Application No.; SYSTEMS AND METHODS OF UPDATING MODEL TEMPLATES ASSOCIATED WITH IMAGES OF RETAIL PRODUCTS AT PRODUCT STORAGE FACILITIES filed Jan. 30, 2023, application Ser. No. 18/102,999; entitled SYSTEMS AND METHODS FOR RECOGNIZING PRODUCT LABELS AND PRODUCTS LOCATED ON PRODUCT STORAGE STRUCTURES OF PRODUCT STORAGE FACILITIES, filed January 2023, Application No. ; and entitled SYSTEMS AND METHODS FOR DETECTING SUPPORT MEMBERS OF PRODUCT STORAGE STRUCTURES AT PRODUCT STORAGE FACILITIES, filed Jan. 30, 2023, application Ser. No. 18/103,338.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for monitoring location labels on product storage structures of a product storage facility, the system comprising:
   an image capture device having a field of view that includes a product storage structure at the product storage facility configured to have products arranged thereon, wherein the image capture device is configured to capture at least one image of the product storage structure, and wherein the image capture device comprises a motorized robotic unit that autonomously moves around the product storage facility;
   a computing device including a control circuit, the computing device communicatively coupled to the image capture device, the control circuit being configured to:
      determine movement instructions for the motorized robotic unit;
      autonomously control the motorized robotic unit by sending the movement instructions, wherein the motorized robotic unit enables the image capture device to capture the at least one image of the product storage structure in sequence;
      analyze the at least one image of the product storage structure captured by the image capture device to detect at least one location label located on the product storage structure, wherein a trained machine learning model is used to detect the at least one location label; and
      based on detection that the at least one location label located on the product storage structure is at least one of missing, incomplete, damaged, deformed, and at least partially obstructed, generate a location label alert indicating that the at least one location label requires a location label check by a worker at the product storage facility; and
   a mobile application executable on a user device of the worker at the product storage facility, the mobile application, when executed, is configured to cause a user interface to be displayed to the worker on a display of the user device, wherein the user interface lists at least one location label alert generated by the control circuit of the computing device, wherein the user interface permits the worker to:
      view a location of the product storage structure associated with the location label alert;
      input an inspection result of a physical inspection of the at least one location label of the product storage structure, wherein the inspection result of the physical inspection is used to retrain the trained machine learning model;
      generate a replacement label for the product storage structure associated with the location label alert and output signaling to cause the replacement label to be printed; and
      scan the replacement label to verify that the worker affixed the replacement label to the product storage structure associated with the location label alert.

2. The system of claim 1,
   wherein the user interface is configured such that each location label alert listed within the user interface is selectable by the worker; and
   wherein, in response to a location label alert being selected by the worker within the user interface, the user interface is configured to display at least a portion of the at least one image of the product storage structure associated with the location label alert selected by the worker.

3. The system of claim 2, wherein, in response to the location label alert being selected by the worker within the user interface, the user interface is configured to display a listing of the products stored on the product storage structure associated with the location label alert selected by the worker.

4. The system of claim 1, wherein the user interface includes selectable fields configured to permit the worker to manually input the location of the product storage structure associated with the location label alert.

5. The system of claim 1, wherein the user interface is configured to permit the worker to select a portable printer for printing the replacement label for the product storage structure associated with the location label alert.

6. The system of claim 1, wherein the user interface is configured to:
   generate a notification to the worker that the replacement label has been printed; and generate a location label scanning feature on the display of the user device to permit the worker to scan the replacement label to verify that the worker affixed the replacement label to the product storage structure associated with the location label alert.

7. The system of claim 1, wherein the image capture device comprises a camera to permit the motorized robotic unit to capture the at least one image of the product storage structure.

8. The system of claim 1, wherein the control circuit is further configured to process the at least one image to:
generate virtual boundary lines that surround the at least one location label detected in the at least one image; and
extract one or more characters from the at least one location label detected in the at least one image.

9. The system of claim 1, further comprising an electronic database configured to store the at least one image captured by the image capture device, and wherein the control circuit is programmed to transmit the location label alert to the electronic database for storage.

10. The system of claim 9, wherein the user interface is further configured to cause the user device of the worker to transmit a notification to at least one of the computing device and the electronic database, the notification indicating that the worker scanned the replacement label to verify that the worker affixed the replacement label to the product storage structure associated with the location label alert.

11. A method of monitoring location labels on product storage structures of a product storage facility, the method comprising:
capturing at least one image of a product storage structure at the product storage facility configured to have products arranged thereon by an image capture device having a field of view that includes the product storage structure at the product storage facility, wherein the image capture device comprises a motorized robotic unit that autonomously moves around the product storage facility;
by a computing device including a control circuit and communicatively coupled to the image capture device:
determining movement instructions for the motorized robotic unit;
autonomously controlling the motorized robotic unit by sending the movement instructions, wherein the motorized robotic unit enables the image capture device to capture the at least one image of the product storage structure in sequence;
analyzing the at least one image of the product storage structure captured by the image capture device to detect at least one location label located on the product storage structure, wherein a trained machine learning model is used to detect the at least one location label; and
based on detection that the at least one location label located on the product storage structure is at least one of missing, incomplete, damaged, deformed, and at least partially obstructed, generating a location label alert indicating that the at least one location label requires a location label check by a worker at the product storage facility; and
by a mobile application executable on a user device of the worker at the product storage facility, causing a user interface to be displayed to the worker on a display of the user device, wherein the user interface lists at least one location label alert generated by the control circuit of the computing device, wherein the user interface permits the worker to:
view a location of the product storage structure associated with the location label alert;
input an inspection result of a physical inspection of the at least one location label of the product storage structure, wherein the inspection result of the physical inspection is used to retrain the trained machine learning model;
generate a replacement label for the product storage structure associated with the location label alert and output signaling to cause the replacement label to be printed; and
scan the replacement label to verify that the worker affixed the replacement label to the product storage structure associated with the location label alert.

12. The method of claim 11,
wherein the user interface is configured such that each location label alert listed within the user interface is selectable by the worker; and
further comprising, in response to a location label alert being selected by the worker within the user interface, displaying within the user interface at least a portion of the at least one image of the product storage structure associated with the location label alert selected by the worker.

13. The method of claim 12, further comprising, in response to the location label alert being selected by the worker within the user interface, displaying within the user interface a listing of the products stored on the product storage structure associated with the location label alert selected by the worker.

14. The method of claim 11, further comprising permitting the worker, via user-selectable fields of the user interface, to manually input the location of the product storage structure associated with the location label alert.

15. The method of claim 11, further comprising permitting the worker to select, via the user interface, a portable printer for printing the replacement label for the product storage structure associated with the location label alert.

16. The method of claim 11, further comprising, via the user interface:
generating a notification to the worker that the replacement label has been printed; and
generating a location label scanning feature on the display of the user device to permit the worker to scan the replacement label to verify that the worker affixed the replacement label to the product storage structure associated with the location label alert.

17. The method of claim 11, wherein the image capture device comprises a camera to permit the motorized robotic unit to capture the at least one image of the product storage structure.

18. The method of claim 11, further comprising, by the control circuit, processing the at least one image to:
generate virtual boundary lines that surround the at least one location label detected in the at least one image; and
extract one or more characters from the at least one location label detected in the at least one image.

19. The method of claim 11, further comprising:
storing the at least one image captured by the image capture device in an electronic database; and
transmitting, the location label alert from the computing device to the electronic database for storage.

20. The method of claim 19, further comprising transmitting, from the user device of the worker and via the user interface, a notification to at least one of the computing device and the electronic database, the notification indicating that the worker scanned the replacement label to verify that the worker affixed the replacement label to the product storage structure associated with the location label alert.

\* \* \* \* \*